US012039883B2

(12) United States Patent
Lee et al.

(10) Patent No.: US 12,039,883 B2
(45) Date of Patent: Jul. 16, 2024

(54) INFORMATION OUTPUT DEVICE

(71) Applicants: DOT INCORPORATION, Seoul (KR); Hee Su Lee, Siheung-si (KR)

(72) Inventors: Hee Su Lee, Siheung-si (KR); Ju Yoon Kim, Gimpo-si (KR); Ji Ho Kim, Gimpo-si (KR); Hyeon Cheol Park, Gwangmyeong-si (KR)

(73) Assignees: Dot Incorporation, Seoul (KR); Hee Su Lee, Siheung (KR)

( * ) Notice: Subject to any disclaimer, the term of this patent is extended or adjusted under 35 U.S.C. 154(b) by 880 days.

(21) Appl. No.: 17/103,157

(22) Filed: Nov. 24, 2020

(65) Prior Publication Data
US 2021/0082314 A1 Mar. 18, 2021

Related U.S. Application Data

(63) Continuation of application No. PCT/KR2019/006253, filed on May 24, 2019.

(30) Foreign Application Priority Data

May 24, 2018 (KR) .................. 10-2018-0058932
May 24, 2018 (KR) .................. 10-2018-0059253

(51) Int. Cl.
  *G09B 21/00* (2006.01)
  *A61H 3/06* (2006.01)
  *G06F 3/01* (2006.01)

(52) U.S. Cl.
  CPC .......... *G09B 21/004* (2013.01); *A61H 3/061* (2013.01); *G06F 3/016* (2013.01); *A61H 2003/063* (2013.01)

(58) Field of Classification Search
  CPC .... G09B 21/004; G09B 21/007; A61H 3/061; A61H 2003/063; G06F 3/016; H01F 5/04; H01F 7/08; H01F 27/30
  See application file for complete search history.

(56) References Cited

U.S. PATENT DOCUMENTS

| 4,871,992 A | 10/1989 | Petersen |
| 5,025,239 A * | 6/1991 | Murashima ............ G03B 17/38 |
| | | 335/265 |

(Continued)

FOREIGN PATENT DOCUMENTS

| CN | 101707007 A | 5/2010 |
| CN | 102176293 A | 9/2011 |

(Continued)

OTHER PUBLICATIONS

International Search Report and Written Opinion dated Sep. 4, 2019 in International Application No. PCT/KR2019/006253, in 11 pages. (English translation of ISR.).

(Continued)

*Primary Examiner* — Jeffrey S Vanderveen
(74) *Attorney, Agent, or Firm* — Knobbe, Martens, Olson & Bear, LLP

(57) ABSTRACT

This application relates to an information output apparatus. The information output apparatus not only improves durability and user convenience but also minimizes power consumption and an operation error of a driving module. The information output apparatus also allows a pin to be driven to be lowered more easily by an attractive force between a magnetic force member and a magnetic member. In addition, the information output apparatus is also provided to prevent the pin from protruding to the outside of an expression surface even when power is not applied.

17 Claims, 42 Drawing Sheets

(56) References Cited

U.S. PATENT DOCUMENTS

| | | | |
|---|---|---|---|
| 5,766,014 A | 6/1998 | Ida et al. | |
| 2002/0050923 A1 | 5/2002 | Petersen | |
| 2023/0335009 A1* | 10/2023 | Kim | G09B 21/004 |

FOREIGN PATENT DOCUMENTS

| | | | |
|---|---|---|---|
| CN | 102792355 A | | 11/2012 |
| CN | 107066101 A | | 8/2017 |
| CN | 112292653 A | | 1/2021 |
| JP | S60-247281 A | | 12/1985 |
| JP | 3025649 U | | 6/1996 |
| JP | H09-305100 A | | 11/1997 |
| JP | 2002-351306 A | | 12/2002 |
| JP | 2005-010729 A | | 1/2005 |
| JP | 2005 266358 A | | 9/2005 |
| KR | 10-2012-0031779 A | | 4/2012 |
| KR | 10-2013-0001746 A | | 1/2013 |
| KR | 10-1661177 B1 | | 9/2016 |
| KR | 10-1718126 B1 | | 3/2017 |
| KR | 10-2017-0071458 A | | 6/2017 |
| KR | 10-2017-0119941 A | | 10/2017 |
| KR | 20170119941 A | * | 10/2017 |
| KR | 10-2017-0125761 A | | 11/2017 |
| KR | 10-2017-0135774 A | | 12/2017 |
| KR | 10-2019-0133929 A | | 12/2019 |

OTHER PUBLICATIONS

First Office Action dated Feb. 7, 2022 in Chinese Application No. 201980034503.1.

Second Office Action dated Jul. 19, 2022 in Chinese Application No. 201980034503.1.

Notice of Allowance dated Nov. 4, 2022 in Chinese Application No. 201980034503.1.

Office Action dated Jun. 22, 2022 in Korean Application No. 10-2022-0031908.

Notice of Allowance dated Nov. 21, 2022 in Korean Application No. 10-2022-0031908.

* cited by examiner

INFORMATION OUTPUT DEVICE

CROSS REFERENCE TO RELATED APPLICATIONS

The present application is a continuation application based on International Patent Application No. PCT/KR2019/006253, filed on May 24, 2019, which claims priority to Korean patent application Nos. 10-2018-0058932 and 10-2018-0059253 both filed on May 24, 2018, contents of all of which are incorporated herein by reference in their entireties.

BACKGROUND

Technical Field

Embodiments of the present disclosure relate to an information output apparatus.

Description of Related Technology

Users may recognize information in various ways. To this end, various types of information output apparatuses are being used.

For example, visual information output apparatuses using printed materials, auditory information output apparatuses using sounds, and the like are used.

Particularly, in modern times, with increase of the amount of information and development of technologies, information output apparatuses including electronic technologies have been widely used, and display apparatuses each having a plurality of pixels have been commonly used as visual information output apparatuses.

However, in the case of such a display device, since various circuits and the like are embedded, manufacturability is reduced and control of the display device is inconvenient.

SUMMARY

Embodiments of the present disclosure are directed to providing an information output apparatus that improves durability and improves user convenience.

Embodiments of the present disclosure are also directed to providing an information output apparatus that minimizes power consumption.

One aspect of the present disclosure provides an information output apparatus including an expression surface including a plurality of expression holes, a plurality of pins configured to protrude to the expression surface through the expression holes and express a protrusion signal on the expression surface, a plurality of driving units located at an inner side of the expression surface and each including a coil to which an electrical signal is applied, and a plurality of movement units which are located at the inner side of the expression surface and respectively interposed between the driving units and the pins, and each of which includes a magnetic force member and rotates in response to a signal applied to the coil to provide a motion to the pin.

The expression surface may include a curved surface.

The driving unit and the movement unit may be provided to be physically separated from each other.

The magnetic force member may be positioned to be spaced apart from a center of the movement unit.

A center of rotation of the movement unit may be positioned to be spaced from a center of the movement unit.

A center of rotation of the movement unit may be movably provided.

The information output apparatus may further include a holder configured to support the movement unit and including a support groove to which a center of rotation of the movement unit is coupled.

The support groove may include at least a linear section extending in a direction toward the pin from the driving unit.

The driving unit may further include a support protruding toward the movement unit.

Another aspect of the present disclosure provides an information output apparatus including one or more information output units, wherein each the information output units includes a coil unit disposed to be connected to a power supply, such that a current flows in the coil unit, a base unit formed to accommodate the coil unit, an expression unit formed and disposed to be sensed by a user, and a driving unit which is disposed in the base unit to be spaced apart from and close to the coil unit and is driven by a current flowing in the coil unit to perform an angular movement or a rotational movement to allow the expression unit to move in a first direction toward the coil unit and a direction opposite thereto.

A guide groove configured to guide a direction and range of movement of the driving unit may be formed in one region of the base unit.

A driving control part corresponding to the guide groove may be further formed in one region of the driving unit.

A magnetic unit having regions of different polarities may be disposed in the driving unit.

The driving unit may include a driving surface on at least an outer surface thereof and may transfer a driving force to the expression unit using the driving surface.

The information output apparatus may further include an adjacent driving part that is formed to be spaced apart from the driving surface and moves together with the driving unit while being spaced apart from the expression unit.

The base unit further includes a first accommodation part configured to accommodate the coil unit, and a second accommodation part disposed adjacent to the first accommodation part in the first direction and configured to accommodate the driving unit.

The information output apparatus may further include a boundary disposed between the first accommodation part and the second accommodation part and formed to distinguish the first accommodation part from the second accommodation part. The information output apparatus may include a plurality of information output units, and the plurality of information output units may be disposed to be spaced apart from each other in one direction or another direction different from the one direction.

An information output apparatus according to embodiments of the present disclosure can improve durability and improve user convenience.

An information output apparatus according to embodiments of the present disclosure can provide a waterproof function even when a pin is exposed to a moisture environment.

An information output apparatus according to embodiments of the present disclosure can reduce power consumption and can be driven with low power.

An information output apparatus according to embodiments of the present disclosure can minimize an operation error of a driving module.

An information output apparatus according to embodiments of the present disclosure allows a pin to be maintained in a certain position even when a voltage is not applied, so that tactile sense can be optimally expressed while minimizing power consumption.

DETAILED DESCRIPTION

Figure 1:
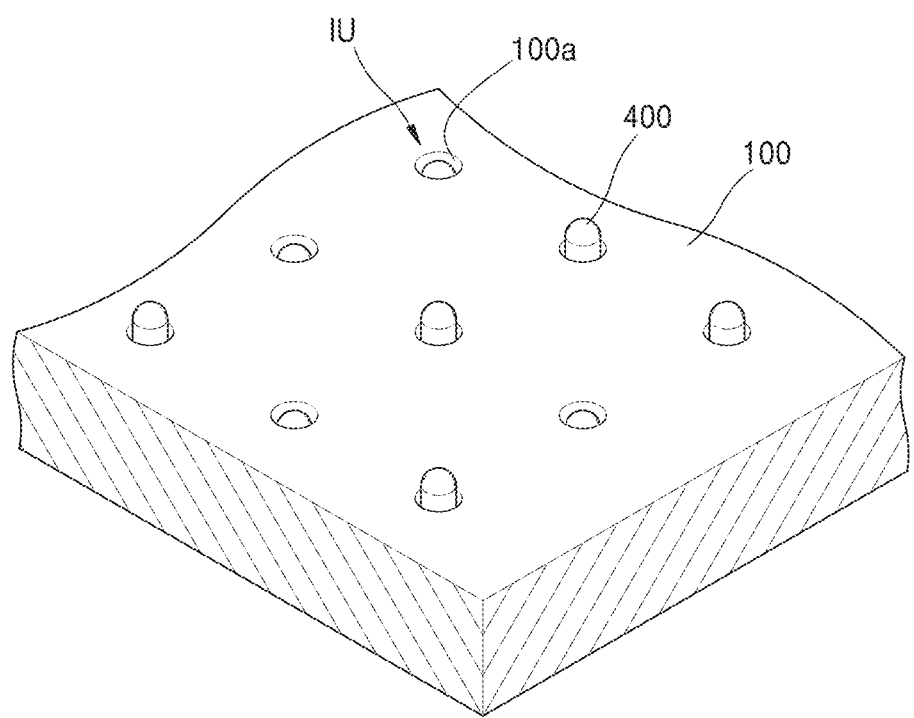
FIG. 1 is a perspective view schematically illustrating an information output apparatus according to one embodiment.

Due to factors including development of technologies and diversification of lifestyles, various types of information output forms are demanded. As an example, users may demand various information output apparatuses according to circumstances. In particular, when a user is handicapped for a particular sense, for example, when a user is visually handicapped or incapacitated, information output through tactile sense is demanded.

When information is output through the tactile sense, it is difficult to control and stably drive the information output, and thus there is a limit for improving user convenience through enhancing an information output apparatus. In addition, an information output apparatus, which outputs information through tactile sense, includes driving devices to implement the tactile sense. When such an information output apparatus is used to implement a wearable device, there is a limit to waterproofing, and thus the wearable device is limited in being applied to real life.

Since the present disclosure may be variously changed and have various embodiments, particular embodiments will be exemplified in the drawings and will be described herein in detail. The effects and features of the present disclosure and the accompanying methods thereof will become apparent from the following description of the embodiments, taken in conjunction with the accompanying drawings. However, the present disclosure is not limited to the embodiments described below, and may be embodied in various modes.

Hereinafter, the embodiments of the present disclosure will be described below in more detail with reference to the accompanying drawings. In the drawings, the same elements are denoted by the same reference numerals, and repeated descriptions thereof will be omitted.

It will be understood that although the terms "first", "second", and the like may be used herein to describe various elements, these elements should not be limited by these terms. These elements are only used to distinguish one element from another.

As used herein, the singular forms include plural forms unless the context clearly dictates otherwise.

It will be further understood that the terms "comprises/includes" and/or "comprising/including" used herein specify the presence of stated features or elements, but do not preclude the presence or addition of one or more other features or elements.

Sizes of elements in the drawings may be exaggerated for the convenience of description. In other words, since sizes and thicknesses of elements in the drawings are arbitrarily illustrated for convenience of description, the following embodiments are not necessarily limited thereto.

In the following examples, an x-axis, a y-axis and a z-axis are not limited to three axes of the rectangular coordinate system, and may be interpreted in a broader sense. For example, the x-axis, the y-axis, and the z-axis may be perpendicular to one another, or may represent different directions that are not perpendicular to one another.

When a certain embodiment may be implemented differently, a specific process sequence may be performed differently from the described order. For example, two consecutively described processes may be performed substantially at the same time or performed in an order opposite to the described order.

In the present specification, like reference numerals are used for like elements.

FIG. 1 is a perspective view schematically illustrating an information output apparatus according to one embodiment.

Referring to FIG. 1, the information output apparatus according to the embodiment may include an expression surface 100 including a plurality of expression holes 100a. This expression surface 100 may include a flat surface as shown in FIG. 1.

A plurality of information output modules IU are located on an inner side of the expression surface 100, and the information output modules IU are located to respectively correspond to the expression holes 100a. A pin 400 of each of the information output modules IU may express a protrusion signal on the expression surface 100 by protruding to the expression surface 100 through the expression hole 100a, The protrusion signal may constitute various signal systems by allowing the plurality of pins 400 to repeat a selective protrusion through the expression holes 100a.

The information output apparatus may be configured such that the expression surface 100 faces a user. Accordingly, a protrusion signal, which is generated by the selective protrusion of the pins 400, expressed on the expression surface 100 may be recognized as a direct and local touch to the user, and the user may receive a direct vibration at a position which has received the touch by the pins 400. Unlike a general vibration signal of a portable electronic apparatus, a protrusion signal formed by the direct and local touch does not produce small vibrations around a target, so that an accurate signal may be transmitted to the user. Thus, a signal achieved through a tactile sense such as Braille may be implemented by the above-described protrusion signal, and besides, various signals such as a military signal, a picture signal, a code signal, and a direction signal may be accurately implemented.

Figure 2:
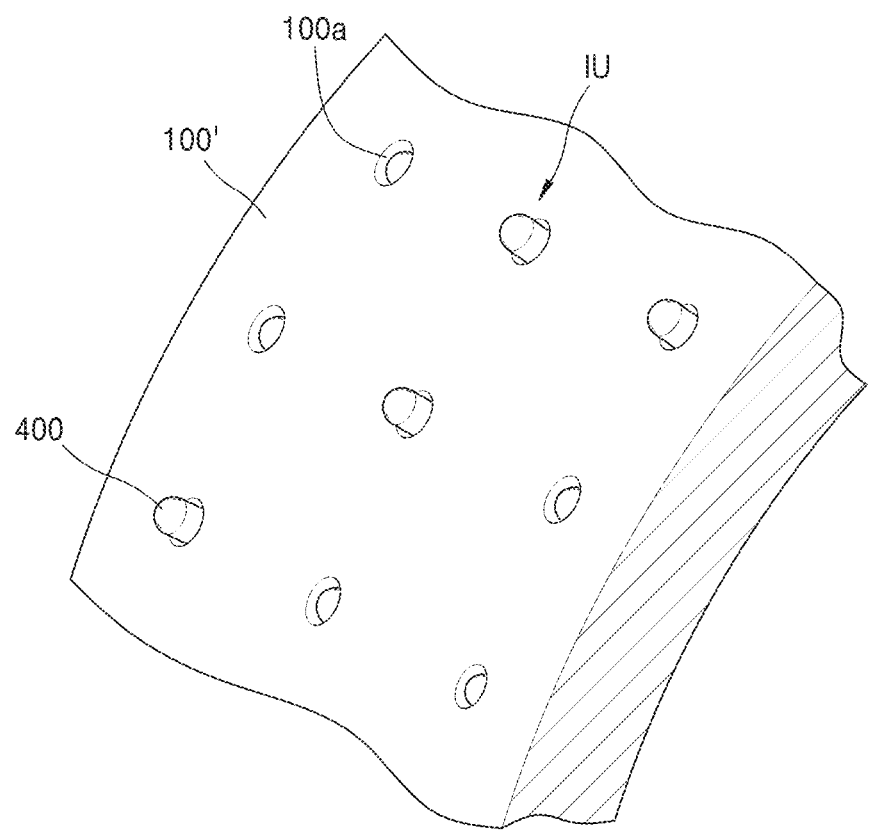
FIG. 2 is a perspective view schematically illustrating an information output apparatus according to anther embodiment.

FIG. 2 is a perspective view schematically illustrating an information output apparatus according to anther embodiment.

The information output apparatus according to the embodiment shown in FIG. 2 includes an expression surface 100' including a curved surface. The expression surface 100' including the curved surface may also include a plurality of expression holes 100a, and the information output module IU may be located on an inner side of the expression hole 100a. The curved surface is illustrated in FIG. 2 as having a single curvature, but the present disclosure is not limited thereto, and the curved surface may include a curved surface of an indeterminate form having a plurality of curvatures. In this case, open directions of at least some of the expression holes 100a may be different from each other, and accordingly, protrusion directions of at least some of the pins 400 may be different from each other.

Figure 3:
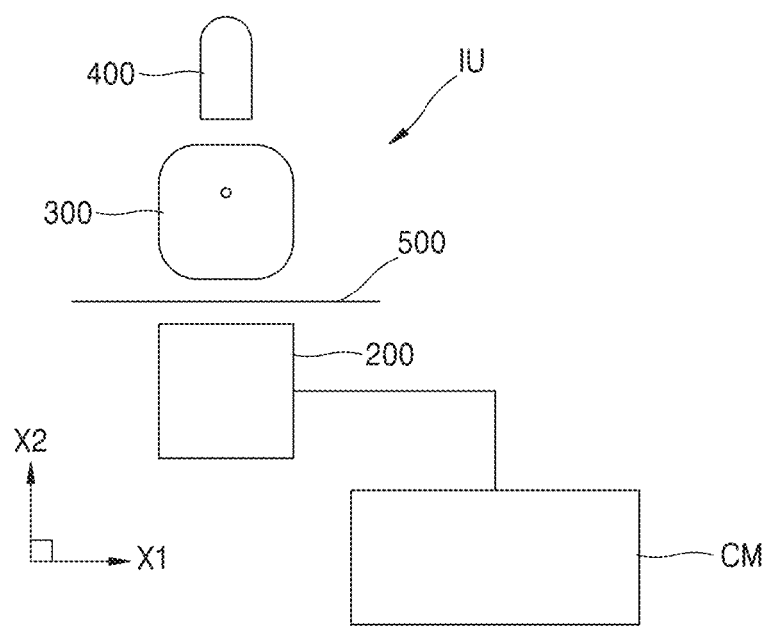
FIG. 3 is a configuration view schematically illustrating an information output module according to one embodiment.

As described above, the information output apparatus according to the embodiments includes the plurality of information output modules IU. FIG. 3 is a configuration view schematically illustrating an information output module IU according to one embodiment.

Referring to FIG. 3, one embodiment of the information output module IU may include a driving unit 200, a movement unit 300, and a pin 400.

The driving unit 200 may include a coil (not shown) electrically connected to a control module CM. The coil may be wound in a first direction X1, and thus a magnetic field may be formed in a second direction X2 as an electrical signal is applied from the control module CM. The driving unit 200 may be provided to remain in a fixed state. The expression of the electric connection does not necessarily refer to a wired connection and includes transferring an electrical signal through wireless communication and includes the existence of another transfer medium therebetween. This is equally applicable to embodiments of the present specification.

The movement unit 300 may be provided to move in response to an operation of the driving unit 200, more specifically, the magnetic field formed due to the coil included in the driving unit 200. To this end, the movement unit 300 may include a magnet (not shown). According to one embodiment, the movement unit 300 may be provided to perform a rotational movement, and as a result, the rotational movement may include a movement in the second direction X2. The movement unit 300 may move depending on the movement of the driving unit 200, and accordingly, may not be electrically connected to the control module CM.

The pin 400 is driven by the movement unit 300 and may move in a second direction.

According to one embodiment, the pin 400 may be in contact with the movement unit 300. In this case, since the movement unit 300 moves in the second direction X2, the pin 400 may selectively protrude in the second direction X2 through the above-described expression hole. The pin 400 may be coupled to the movement unit 300, but the present disclosure is not necessarily limited thereto, and a transfer medium that transfers a physical movement between the movement unit 300 and the pin 400 may be included therebetween.

According to the embodiments of the present disclosure, the pin 400 is not necessarily limited thereto, and at least some of the pins 400 may each be separated from the movement unit 300. In this case, the pin 400 may be in direct or indirect contact with the movement unit 300, or may indirectly cooperate with the movement of the movement unit 300 in the second direction X2 through a separate link mechanism (not shown) or a separate motion transfer mechanism (not shown) with the movement unit 300 to move in the second direction. The second direction, which is a movement direction of the pin 400, may include various directions including the second direction X2, which is a movement direction of the movement unit 300, and also including the first direction X1 In this case, the second direction, which is the movement direction of the pin 400, may be a protrusion direction for implementing the above-described protrusion signal. The embodiments of the present specification described below are based on the embodiment in which the pin 400 is coupled to the movement unit 300, but are not necessarily limited thereto, and as described above, are equally applicable to an embodiment in which the pin 400 is separated from the movement unit 300.

The second direction X2 may be a direction different from the first direction X1. According to the embodiment shown in FIG. 3, the second direction X2 may form a right angle with the first direction X1.

Selectively, when a position of the information output apparatus changes like a case in which the information output apparatus overturns, in order to prevent the pin 400 and/or the movement unit 300 from protruding to the outside of the expression surface 100 in a state in which power is not applied to the driving unit 200, a separate device (not shown) may be interposed between the pin 400 and/or the movement unit 300 and the inner side of the expression surface 100. Such a device may be an elastic member, and when magnetic force of the driving unit 200 exceeds elastic force of the elastic member, the pin 400 may protrude to the outside of the expression surface 100. This embodiment is applicable to all of embodiments of the present specification.

Meanwhile, as shown in FIG. 3, a partition wall 500 may be interposed between the driving unit 200 and the movement unit 300, and the driving unit 200 and the movement unit 300 may be physically separated from each other by the partition wall 500. Since the driving unit 200 is physically separated from the movement unit 300 as described above, the driving unit 200 may be sealed from moisture, so that a more improved waterproof structure may be achieved, and even when the movement unit 300 is in an environment exposed to moisture, the driving unit 200 may not be affected by this environment.

Figure 4:
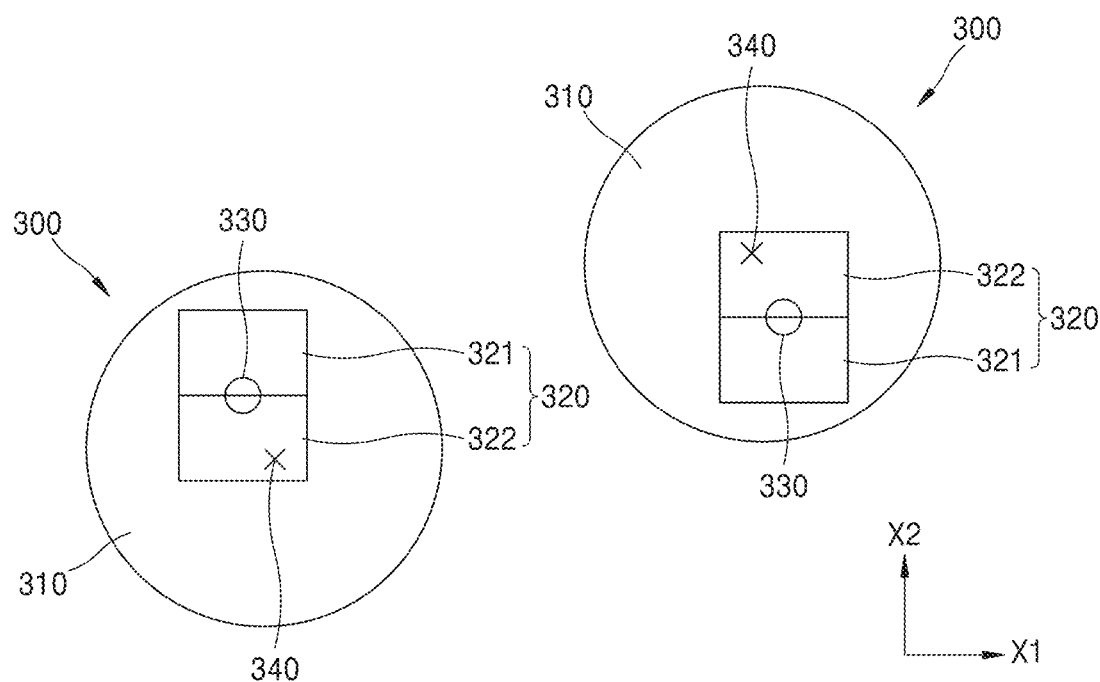
FIG. 4 is a diagram schematically illustrating one embodiment of a movement unit.

FIG. 4 is a schematic cross-sectional view of one embodiment of the movement unit 300.

The movement unit 300 may include a body 310 that is rotatably provided, and the body 310 may be provided in a circular plate shape as shown in FIG. 4. However, the body 310 is not necessarily limited thereto, and may have various shapes capable of transmitting power to the pin as the body 310 rotates about a rotational axis 330.

The body 310 of the movement unit 300 rotates about the rotational axis 330, and the rotational axis 330 may be located to be spaced apart from a center portion of the movement unit 300, more specifically from a center 340 of the body 310. Accordingly, as shown on the right side of FIG. 4, when the body 310 rotates about the rotational axis 330, the same effect as that the body 310 moves in the second direction X2 is achieved. Since the body 310 rotates and thus moves in the second direction X2 as described above, and the movement of the body 310 is transmitted to the pin 400, the pin 400 may also move in the second direction X2.

The movement unit 300 may include a magnetic force member 320. Selectively, the magnetic force member 320 may also be located to be spaced apart from the center portion of the movement unit 300, specifically, the center 340 of the body 310. Accordingly, when the body 310 of the movement unit 300 rotates under the influence of the magnetic field due to the coil of the driving unit 200, the body 310 may rotate efficiently with less force.

The magnetic force member 320 may be embedded in the body 310, and in this case, a permanent magnet may be used. However, the present disclosure is not necessarily limited thereto, and a magnetic body in which an N-pole 321 and an S-pole 322 are formed in the second direction X2 may be used.

Figure 5:
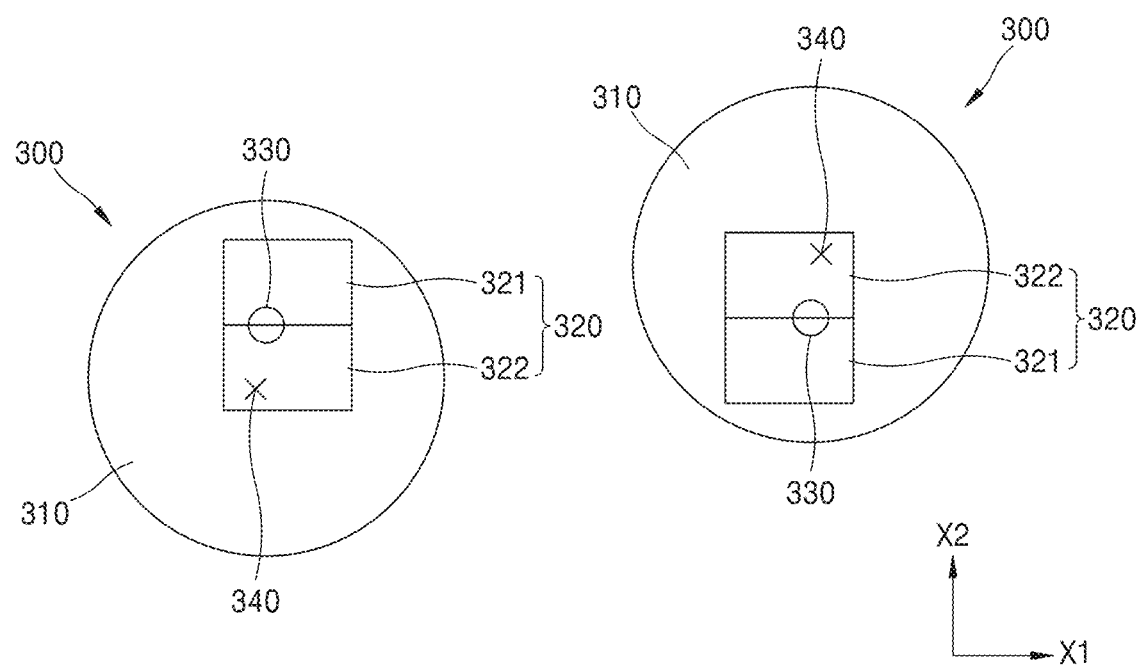
FIG. 5 is a diagram schematically illustrating an embodiment of the movement unit.

As in the embodiment shown in FIG. 4, the center of the magnetic force member 320 may be located at the same position as the rotational axis 330 of the body 310. However, the present disclosure is not necessarily limited thereto, and as in the embodiment shown in FIG. 5, the center of the magnetic force member 320 may be spaced apart from the rotational axis 330 of the body 310. By adjusting the positional relationship between the center of the magnetic force member 320 and the rotational axis 330 of the body 310 as described above, the efficiency of rotating the body 310 may be maximized.

Meanwhile, the rotational axis 330 of the body 310 may be formed in various shapes.

Figure 6:
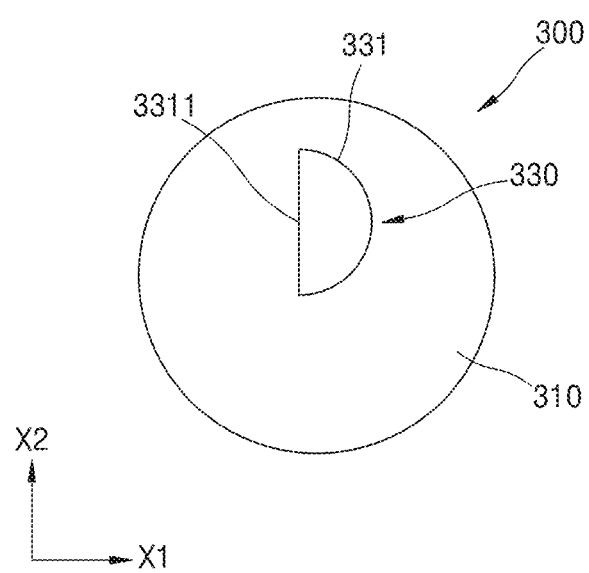
FIG. 6 is a diagram schematically illustrating still an embodiment of the movement unit.

That is, as shown in FIG. 6, the rotational axis 330 may include a first rotational axis 331. The first rotational axis 331 may be formed in a semi-circular shape, for example, may include a straight portion 3311 extending in the second direction X2. The straight portion 3311 may be located close to the center of rotation.

Figure 7:
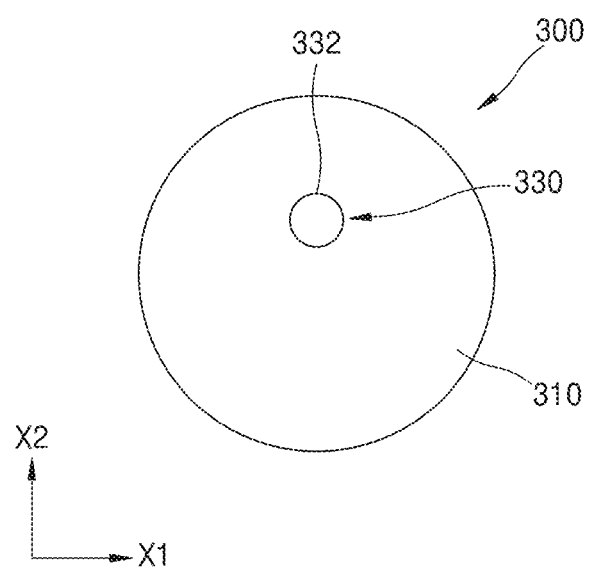
FIG. 7 is a diagram schematically illustrating yet an embodiment of the movement unit.

According to an embodiment shown in FIG. 7, the rotational axis 330 may include a second rotational axis 332. The second rotational axis 332 may have a circular shape.

Figure 8:
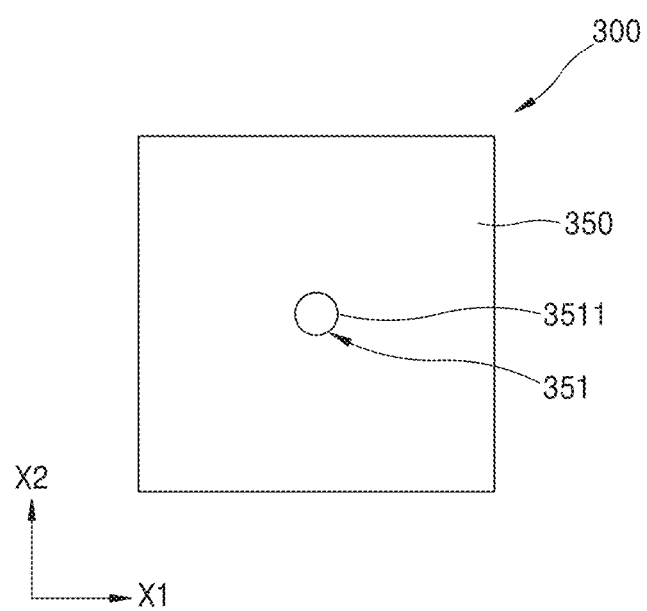
FIG. 8 is a diagram schematically illustrating one embodiment of a holder of the movement unit.

As shown in FIG. 8, the above-described body 310 may be mounted on a holder 350. The holder 350 may be formed in a box shape and may include a support groove 351, and the support groove 351 has an inside in which the body 310 is accommodated and the rotational axis 330 of the body 310 is supported. The holder 350 may have a sufficient space therein so that the body 310 rotates in a state in which the rotational axis 330 is supported by the support groove 351.

Figure 9:
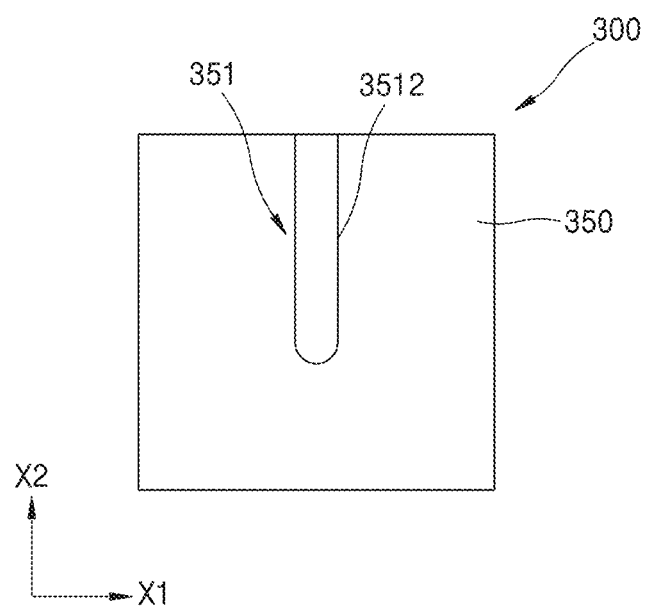
FIG. 9 is a diagram schematically illustrating an embodiment of the holder of the movement unit.

The above-described support groove 351 may be formed in various shapes, and according to the embodiment shown in FIG. 9, the support groove 351 may include a first support groove 3511 provided in a circular shape. Accordingly, the body may rotate in a state in which the position of the rotational axis 330 mounted in the support groove 351 is maintained without being changed.

According to an embodiment shown in FIG. 9, the support groove 351 may include a second support groove 3512. The second support groove 3512 may be formed in a straight line shape. The second support groove 3512 may extend in the second direction X2. Accordingly, the position of the rotational axis 330 mounted in the second support groove 3512 may move in the second direction X2. Since the position of the rotational axis 330 moves in the second direction X2, the body 310 may move in the second direction X2 while rotating, which may enable the body 310 to move the pin 400 with only a small force. In addition, since the body 310 rotates in the second direction X2 and moves toward the pin 400, the pin 400 may be maintained in a fixed state even in a state in which electricity is cut off in the coil.

Figure 10:
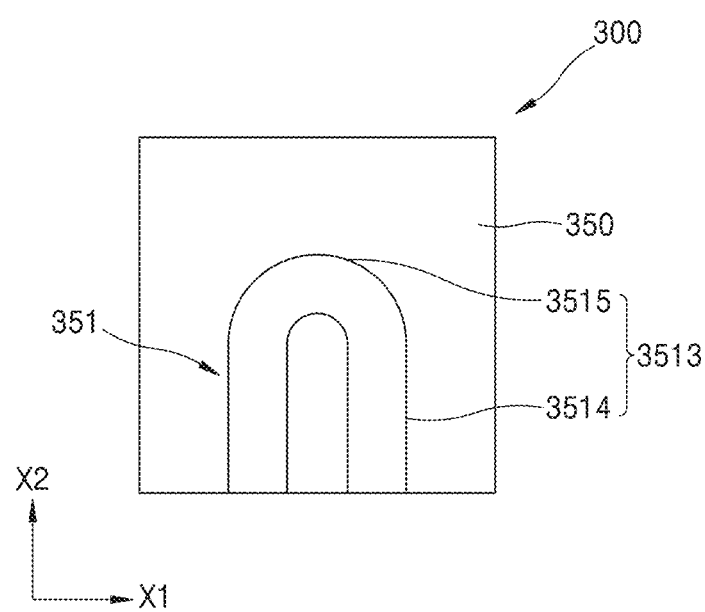
FIG. 10 is a diagram schematically illustrating still an embodiment of the holder of the movement unit.

Such a straight line shape may be provided in various forms, and according to the embodiment shown in FIG. 10, the support groove 351 may include a third support groove 3513 provided in an inverted U-shape. The third support groove 3513 may include a straight section 3514 and a curved section 3515. Accordingly, as the body 310 rotates, the rotational axis 330 located in the straight section 3514 may move to another straight section through the curved section 3515. Accordingly, in a state in which the pin 400 is raised and lowered outside the expression surface, the distance between the magnetic force member and the coil may be maintained to be the same, and accordingly, it is possible to move the pin 400 with low power.

Various embodiments of the movement unit 300 as described above are applicable to all of the embodiments of the present disclosure in combination.

Figure 11:
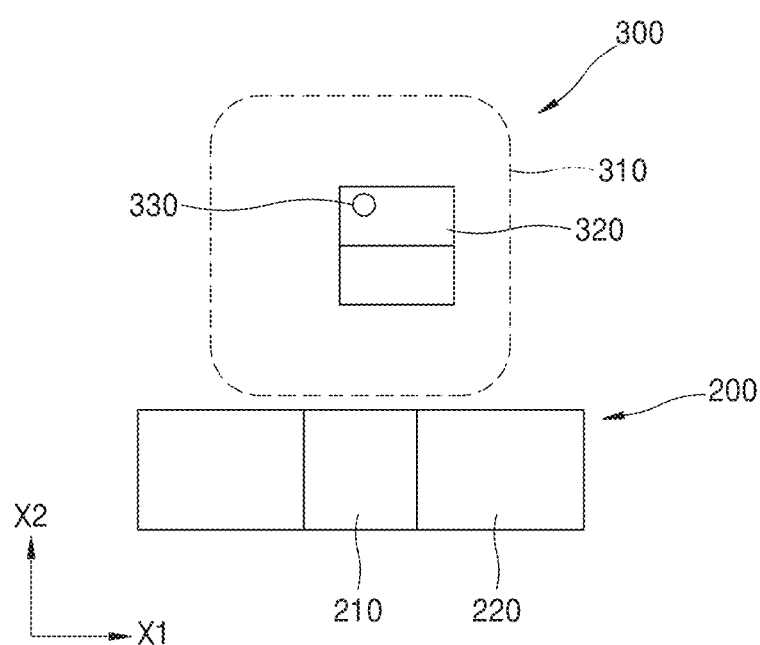
FIG. 11 is a diagram schematically illustrating one embodiment of a driving unit.

According to the embodiment shown in FIG. 11, the driving unit 200 may include a coil axis 210 and a coil 220.

The coil axis 210 may extend in the second direction X2, and the coil 220 may be wound around the coil axis 210. Accordingly, as an electrical signal is applied to the coil 220, the coil 220 may form a magnetic field in the second direction X2. Magnetic polarities in the magnetic field may be changed in the second direction X2 according to the type of the electrical signal, and as the magnetic force member 320 reacts to the change in the magnetic polarities, the body 310 may rotate about the rotational axis 330.

According to the embodiment shown in FIG. 11, the coil 220 may be wound around over the entire length of the coil axis 210. However, the coil 220 is not necessarily limited thereto, and may be wound around a portion of the coil axis 210. The coil axis 210 may be made of a plastic material, but is not necessarily limited thereto, and may be made of a magnetic material such as a metal. Accordingly, even in a state in which electricity applied to the coil 220 is cut off, corresponding magnetism may be maintained on the coil axis 210 to a certain extent.

Figure 12:
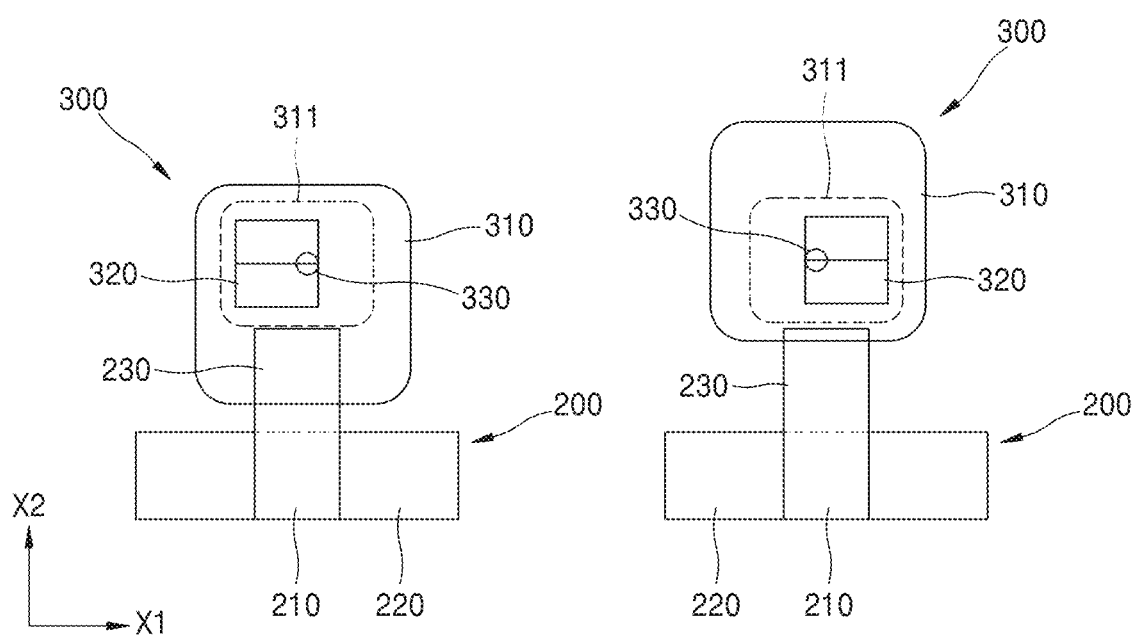
FIG. 12 is a diagram schematically illustrating an embodiment of the driving unit.

According to an embodiment shown in FIG. 12, the driving unit 200 may further include a support 230 protruding toward the movement unit 300. The support 230 may extend in the second direction X2 and may be coupled to the coil axis 210, and in a case in which the coil axis 210 is made of a magnetic material, the coil axis 210 and the support 230 may be integrally formed. However, the present disclosure is not necessarily limited thereto, and only the coil axis 210 may be made of a magnetic material, and the support 230 may be made of a non-magnetic material.

Figure 13:
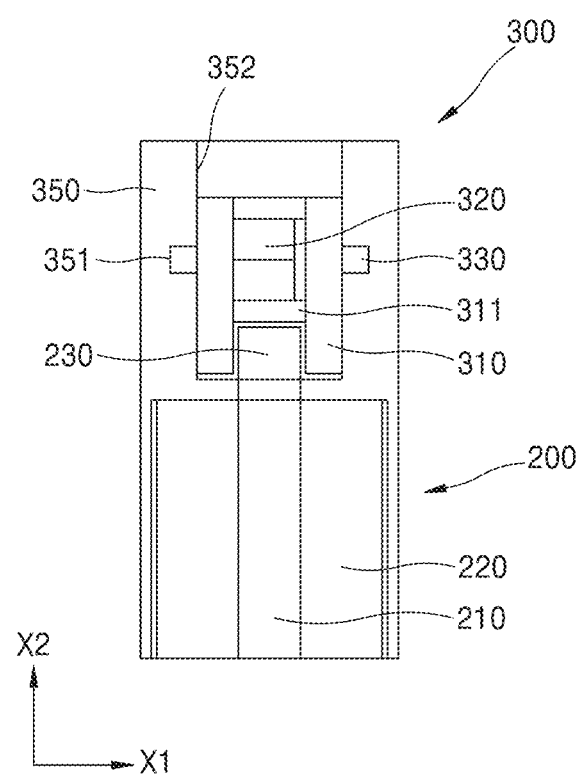
FIG. 13 is a diagram illustrating one embodiment of an assembly of the driving unit and the movement unit.

According to the embodiment shown in FIG. 12, the body 310 may include an accommodation portion 311 in which a magnet member 320 is accommodated, and the accommodation portion 311 may be located to be inwardly spaced apart from an outer edge of the body 310. In addition, the support 230 may be provided to protrude to an inside of the body 310 and extend to a position adjacent to the accommodation portion 311. For example, as shown in FIG. 13, the accommodation portion 311 is provided between a pair of bodies 310 so that the support 230 does not interfere with the rotation of the body 310 even when the support 230 is inserted into the inside of the body 310. In this case, the holder 350 allows the body 310 to rotate sufficiently in an inner space 352. Since the support 230 protrudes to the inside of the body 310 and extends to the position adjacent to the accommodation portion 311 as described above, when the body 310 rotates, the support 230 supports the body 310, for example, the accommodation portion 311, so that the body 310 may stably rotate.

As the support 230 is elongated, the distance between the support 230 and the magnetic force member 320 may be kept to be small. When the support 230 is made of a magnetic material, the support 230 may have a specific polarity due to the magnetic force formed by the coil 220, and thus, even when a small magnetic force is applied, the support 230 may more effectively affect the magnetic force member 320. Thus, driving with low power may also be enabled. In addition, even when electricity is cut off after being applied to the coil 220, the support 230 may maintain magnetism, so that the body 310 may not rotate in reverse again and may be maintained in a fixed state even in the state on the right side of FIG. 12. Accordingly, even when power is not applied, the pin 400 may be maintained in a protruding state. Thus, it is not necessary to continuously apply electricity to the coil 220 to keep the pin 400 in a protruding state. This may lead to an effect of lowering the operating power and/or power consumption of the entire apparatus.

Figure 14:
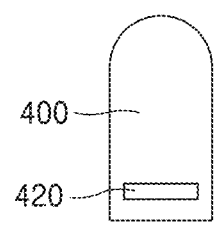
FIG. 14 is a diagram schematically illustrating an embodiment of a pin.

Meanwhile, as shown in FIG. 14, the pin 400 may further include a magnetic member 420. The magnetic member 420 may be formed in a plate shape or a shape having a volume. In addition, although not shown in the drawings, the magnetic member may be coated on the pin 400 in the shape of a film or may be mixed with the pin 400 when the pin 400 is formed.

Since the pin 400 includes the magnetic member 420 as described above, it is possible to prevent the pin 400 from protruding to the outside of the expression surface even when power is not applied. When the pin 400 is driven to protrude to the outside of the expression surface and then down into the inside of the expression surface again, the pin 400 may be driven to be lowered more easily not only by the movement of the pin 400 due to self-weight but also by the attractive force between the magnetic member 420 and the magnetic force member 320.

Since the down drive is easily performed and the function of preventing the pin from protruding may be performed without power applied, the entire device may be driven with low power.

This embodiment is applicable to all of embodiments of the present disclosure.

Figure 15:
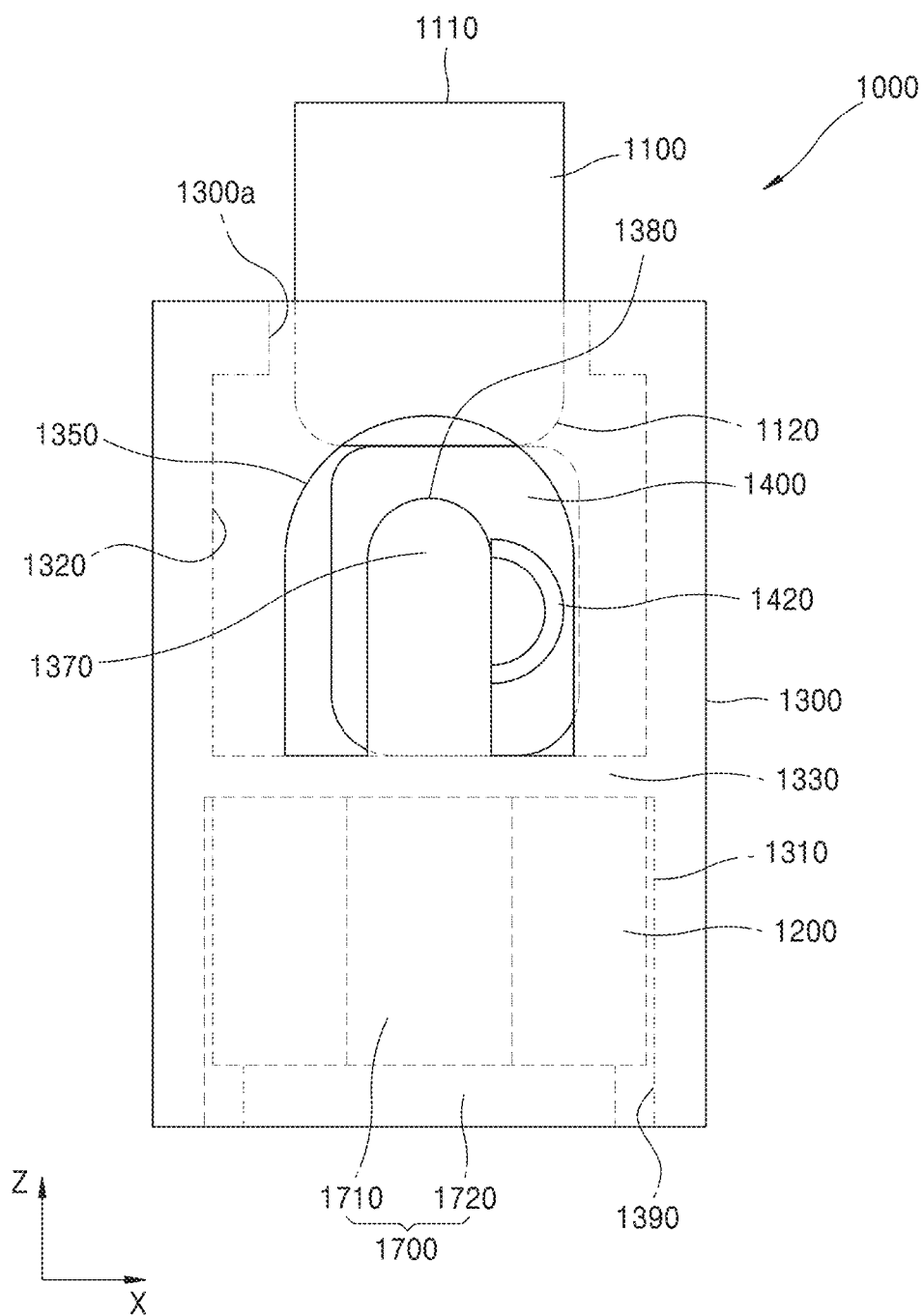
FIG. 15 is a transparent front view schematically illustrating an information output apparatus according to still an embodiment of the present disclosure.
Figure 16:
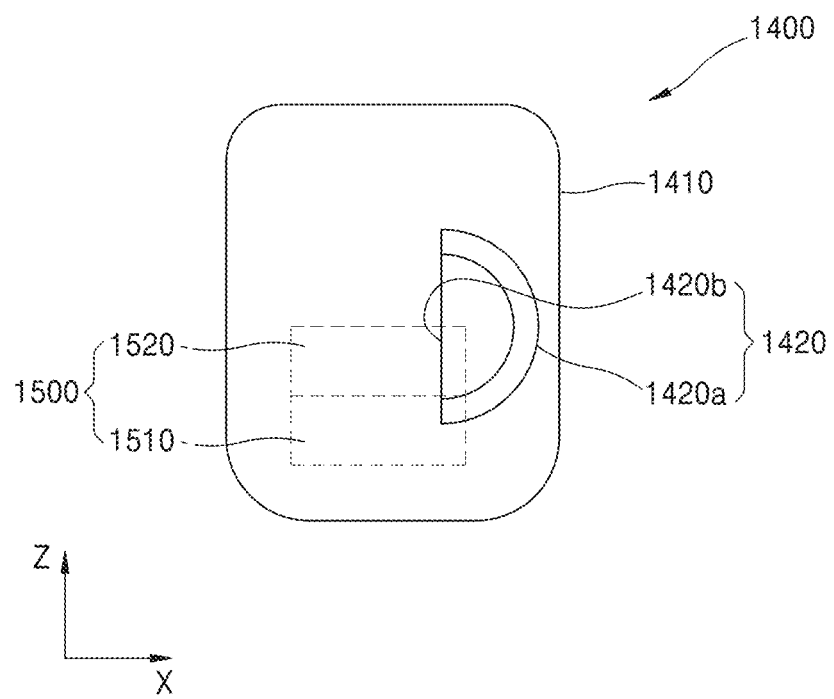
FIG. 16 is a diagram for describing a driving unit of FIG. 15.
Figure 17:
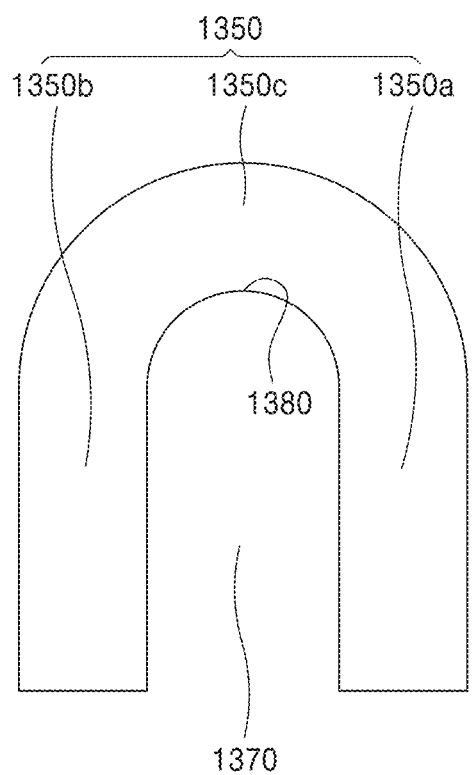
FIG. 17 is a diagram for describing a guide groove of the information output apparatus of FIG. 15.

FIG. 15 is a transparent front view schematically illustrating an information output apparatus according to still an embodiment of the present disclosure, FIG. 16 is a diagram for describing a driving unit of FIG. 15, and FIG. 17 is a diagram for describing a guide groove of the information output apparatus of FIG. 15.

Referring to FIG. 15 to FIG. 17, an information output apparatus 1000 of the present embodiment includes at least one information output unit, and FIG. 15 illustrates one information output unit. That is, the information output apparatus 1000 of FIG. 15 may be one information output unit.

One information output unit is illustrated in FIG. 15, but in an alternative embodiment, the information output apparatus 1000 may include two or three or more information output units.

That is, the information output apparatus 1000 may include various numbers of information output units according to purposes, characteristics of applied products, and user characteristics.

For convenience of description, an information output apparatus including one information output unit as shown in FIG. 15 will be described.

The information output apparatus 1000 may include a coil unit 1200, a base unit 1300, a driving unit 1400, and an expression unit 1100.

The base unit 1300 may include one or more guide grooves 1350.

The expression unit 1100 may move according to the movement of the driving unit 1400, which will be described below, and may move downward and upward with respect to a lengthwise direction of the expression unit 1100. For example, the expression unit 1100 may move in one direction toward the coil unit 1200 and a direction opposite thereto.

Accordingly, the expression unit 1100 may move to protrude in one direction, and a user may sense the movement of the expression unit 1100 through a tactile or visual sense.

The expression unit 1100 may include an expression surface 1110 and a support surface 1120.

The support surface 1120 is a surface of the expression unit 1100 facing the driving unit 1400, and may form a lower region of the expression unit 1100 and may be in contact with the driving unit 1400. The driving unit 1400 may transmit power to the expression unit 1100 through the support surface 1120. For example, a driving surface of the driving unit 1400 may be in contact with the support surface 1120 to move the support surface 1120 in a first direction, that is, a Z-axis direction in FIG. 15.

The expression surface 1110 is an outermost side of the expression unit 1100, for example, a region of the expression unit 1100 farthest from the coil unit 1200, and may include a region recognized by a user.

For example, the user may recognize the entire region of the expression unit 1100, but may also recognize only the expression surface 1110. For example, the user may sense the movement of the expression unit 1100 by contacting the expression surface 1110, and also may easily sense the movement of the expression unit 1100 by visually sensing the expression surface 1110.

In an alternative embodiment, the expression surface 1110 may include a curved surface.

The expression unit 1100 may have various shapes and may include a pillar-shaped region, for example, a region having an approximately cylindrical shape.

Further, in an alternative embodiment, a protruding region of the expression unit 1100 may have a curved surface or curved corners.

The expression unit 1100 may include various materials or may be made of an insulating material that is light-weight and has an excellent durability. For example, the expression unit 1100 may include a resin-based organic material. In another example, the expression unit 1100 may include an inorganic material like a ceramic.

Further, in another alternative embodiment, the expression unit 1100 may be made of a metal or glass material.

The coil unit 1200 may be formed to be connected to an external power supply (not shown). When a current flows in the coil unit 1200, a magnetic field may be formed around the coil unit 1200.

The coil unit 1200 may have various shapes, for example, the coil unit 1200 may have a shape in which an electric wire is wound a plurality of times, and the number of times that the electric wire is wound may be variously adjusted.

Due to a magnetic field formed by the current flowing in the coil unit 1200, the driving unit 1400 may move, and the movement of the driving unit 1400 may provide a driving force that enables the expression unit 1100 to move.

In an alternative embodiment, a support unit 1700 may be further disposed, and the support unit 1700 may be disposed such that at least one region thereof may be adjacent to or support the coil unit 1200.

For example, the support unit 1700 includes an extension member 1710, and may be disposed such that the extension member 1710 passes through the coil unit 1200, and as a specific example, the support unit 1700 may have a shape in which a plurality of coils of the coil unit 1200 are wound around the extension member 1710.

In an alternative embodiment, one end of the extension member 1710 may be elongated to overlap one region of the driving unit 1400 to be described below, or may be formed to support the one region.

In an alternative embodiment, the support unit 1700 includes a body member 1720, and the extension member 1710 may be connected to the body member 1720.

As a specific example, the extension member 1710 may have a shape extending long in a direction close to the expression unit 1100 from the body member 1720.

In an alternative embodiment, the coil unit 1200 may include coils in a shape wound around the extension member 1710 on the body member 1720.

In an alternative embodiment, the body member 1720 and the extension member 1710 of the support unit 1700 may be integrally formed.

In an alternative embodiment, although not shown in the drawings, the support unit 1700 may further include a supporting portion (not shown) to support the body member 1720, and the body member 1720 may be disposed on the supporting portion (not shown).

In an alternative embodiment, the support unit 1700 may include a magnetic material, and as a specific example, the extension member 1710 may include a magnetic material. Accordingly, when a magnetic field is formed through the coil unit 1200, the magnitude of the magnetic field may increase, and the magnetic field may be effectively formed, so that the power consumption of the information output apparatus 1000 may be reduced.

The base unit 1300 may be formed to accommodate the coil unit 1200, For example, the base unit 1300 may include a first accommodation portion 1310, a second accommodation portion 1320, and the guide grooves 1350.

The first accommodation portion 1310 and the second accommodation portion 1320 may be disposed to be adjacent to each other and may be disposed not to overlap each other.

In an alternative embodiment, the first accommodation portion 1310 may be spaced apart from the second accommodation portion 1320.

In another alternative embodiment, the first accommodation portion 1310 may be connected to the second accommodation portion 1320 through a through hole.

The coil unit 1200 may be disposed in the first accommodation portion 1310.

In an alternative embodiment, the above-described support unit 1700 may be disposed in the first accommodation portion 1310, and in another alternative embodiment, although not shown in the drawings, one region of the support unit 1700, for example, one region of the extension member 1710 may be elongated and disposed up to the second accommodation portion 1320 through the through hole.

The guide grooves 1350 may be formed in the second accommodation portion 1320. For example, the guide grooves 1350 may be formed on both inner side surfaces of the second accommodation portion 1320 of the base unit 1300 facing each other, and in another alternative embodiment, the guide groove 1350 may be formed only on one inner side surface thereof.

The guide groove 1350 may have a through-hole shape, and as another example, may have a groove shape that is not exposed to the outside of the base unit 1300.

Referring to FIG. 17, the guide groove 1350 may include a first groove 1350a, a second groove 1350b, and a connection groove 1350c.

The first groove 1350a and the second groove 1350b may be spaced apart from each other, and in an alternative embodiment, an intermediate portion 1370 may be formed between the first groove 1350a and the second groove 1350b.

The first groove 135a0 and the second groove 1350b may be formed to be parallel to each other. As a specific example, the first groove 1350a and the second groove 1350b may be disposed in parallel with each other in a direction parallel to one direction in which the expression unit 1100 moves vertically.

The connection groove 1350c may be formed to connect between the first groove 1350a and the second groove 1350b. In an alternative embodiment, the connection groove 1350c may include a curved surface.

In an alternative embodiment, an upper surface 1380 of the intermediate portion 1370, that is, a surface of a region of the intermediate portion 1370, which is closest to the expression unit 1100, may include a curved surface, and as a specific example, the upper surface 1380 may include a curved surface parallel to the connection groove 1350c.

Accordingly, at least one region of the connection groove 1350c may have an approximately circular arc shape, and in an alternative embodiment, the connection groove 1350c may include a region corresponding to an arc of a semicircle.

In an alternative embodiment, the guide groove 1350 may have a shape similar to an alphabet letter "U."

The base unit 1300 may have a shape extending long to accommodate the coil unit 1200 and the driving unit 1400, or may be formed to entirely surround both the coil unit 1200 and the driving unit 1400.

In an alternative embodiment, the base unit 1300 may include a boundary 1330 between the first accommodation portion 1310 and the second accommodation portion 1320.

The first accommodation portion 1310 may be separated from the second accommodation portion 1320 through the boundary 1330.

In an alternative embodiment, although not shown in the drawings, a through hole may be formed in the boundary 1330, and the through hole may be disposed such that one region of the support unit 1700 extends and passes therethrough.

Further, the base unit 1300 includes an entry 1300a, and the entry 1300a may be connected to the second accommodation portion 1320. The expression unit 1100 may move through the entry 1300a such that a length at which the expression unit 1100 protrudes to the outside of the base unit 1300 is changed.

In an alternative embodiment, the base unit 1300 may include an open region 1390, and specifically, the open region 1390 may be formed to be connected to the first accommodation portion 1310.

The support unit 1700 and the coil unit 1200 may be easily disposed, replaced, or repaired through the open region 1390.

The driving unit 1400 may be disposed in the base unit 1300. The driving unit 1400 may be disposed in the second accommodation portion 1320 and may be spaced apart from the coil unit 1200 that is disposed in the first accommodation portion 1319.

The driving unit 1400 may be disposed to be adjacent to the coil unit 1200, and may be driven by the current flowing in the coil unit 1200 to perform an angular movement or a rotational movement. The expression unit 1100 may move downward and upward, for example, in one direction toward the coil unit and a direction opposite thereto due to the driving unit 1400.

In an alternative embodiment, referring to FIG. 16, a magnetic unit 1500 may be disposed, for example, in an inner space of the driving unit 1400. For example, the magnetic unit 1500 may include a magnetic material, and for example, may include a permanent magnet.

The magnetic unit 1500 may have a first region 1510 (e.g., an N-pole or an S-pole) and a second region 1520 (e.g., an S-pole or an N-pole) of different polarities, and the first region 1510 and the second region 1520 of different polarities may be arranged in a direction toward the expression unit 1100 from the coil unit 1200, for example, in the Z-axis direction, at one point during the rotation of the driving unit 1400.

In an alternative embodiment, when the driving unit 1400 is at the lowest point, the central axis of the magnetic unit 1500 and the central axis of the coil unit 1200 may not be aligned with each other and may be deviated from each other. Accordingly, when the driving unit 1400 is driven by the magnetic field formed by the coil unit 1200, torque may be generated in the driving unit 1400, and the driving unit 1400 may easily perform the rotational or angular movement.

For example, on the basis of FIG. 15, the first and second regions of the magnetic unit 1500 having different polarities may be arranged in a direction toward the expression unit 1100 from the coil unit 1200, for example, in the Z-axis direction.

In an alternative embodiment, an outer surface of driving unit 1400 may include a driving surface, and at least one region of the driving surface, for example, an edge region thereof may include a curved surface. In addition, the outer surface of the driving unit 1400 may be formed to support the expression unit 1100 and may provide a driving force for the downward and upward movement of the expression unit 1100.

Accordingly, the motion of the expression unit 1100 may be efficiently performed and the precise expression of the information output apparatus 1000 may be improved. Further, power consumption of the information output apparatus 1000 may be reduced.

The driving unit 1400 may include a driving control part 1420.

The position of the driving unit 1400 at the time of driving may be controlled through the driving control part 1420. For example, when the driving unit 1400 is moved by the coil unit 1200, the driving unit 1400 may move in a state in which the driving control part 1420 is disposed in the guide groove 1350.

In an alternative embodiment, the driving control part 1420 may move approximately along the shape of the guide groove 1350, for example, a shape similar to an alphabet letter "U."

The driving control part 1420 may have a protruding shape, for example, a shape protruding from a side surface of the driving unit 1400, and the driving control part 1420 may be disposed in the guide groove 1350.

In an alternative embodiment, the driving control part 1420 may include an outer side surface 1420a and an inner side surface 1420b.

The outer side surface 1420a is a surface facing an outer side surface of the guide groove 1350 when the driving unit 1400 is disposed in the guide groove 1350, for example, a surface close to an outer surface of the base unit 1300.

The inner side surface 1420b is a surface facing an inner side surface of the guide groove 1350, for example, the intermediate portion 1370 when the driving unit 1400 is disposed in the guide groove 1350.

In an alternative embodiment, the outer side surface 1420a may include a curved surface. Accordingly, when the driving unit 1400 moves within the guide groove 1350, the outer side surface 1420a may stably move through the first groove 1350a, the second groove 1350b, and the connection groove 1350c, and in an alternative embodiment, when the connection groove 1350c has a curved surface or at least one region of a circular arc shape, the friction between the connection groove 1350c and the outer side surface 1420a may be reduced, so that the driving unit 1400 may move smoothly, thereby improving efficiency.

In an alternative embodiment, at least one region of the inner side surface 1420*b* may have a flat surface. Accordingly, the driving unit 1400 may be stably moved, for example, when the driving control part 1420 is raised and disposed on the upper surface 1380 of the intermediate portion 1370, the driving control part 1420 may be stably placed on the upper surface 1380 of the intermediate portion 1370.

Figure 18A:
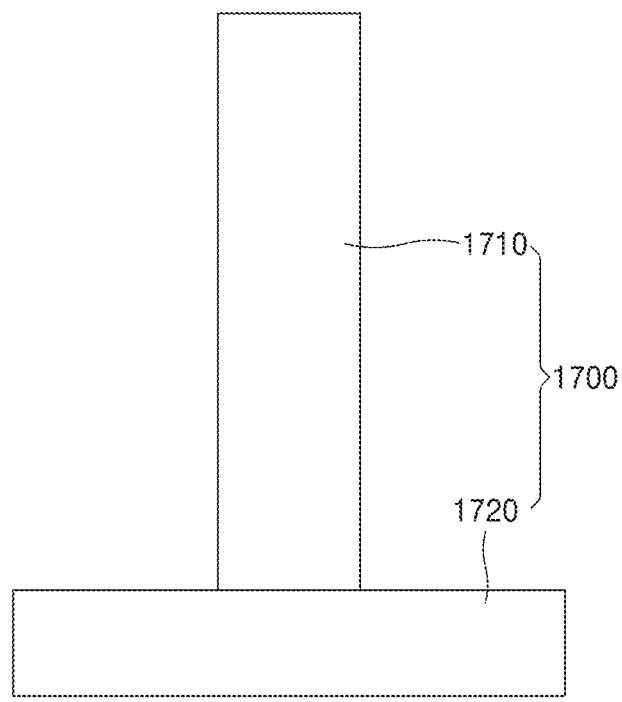
FIGS. 18A and 18B are diagrams illustrating a support unit of the information output apparatus of FIG. 15 and a modified example of the support unit, respectively.
Figure 18B:
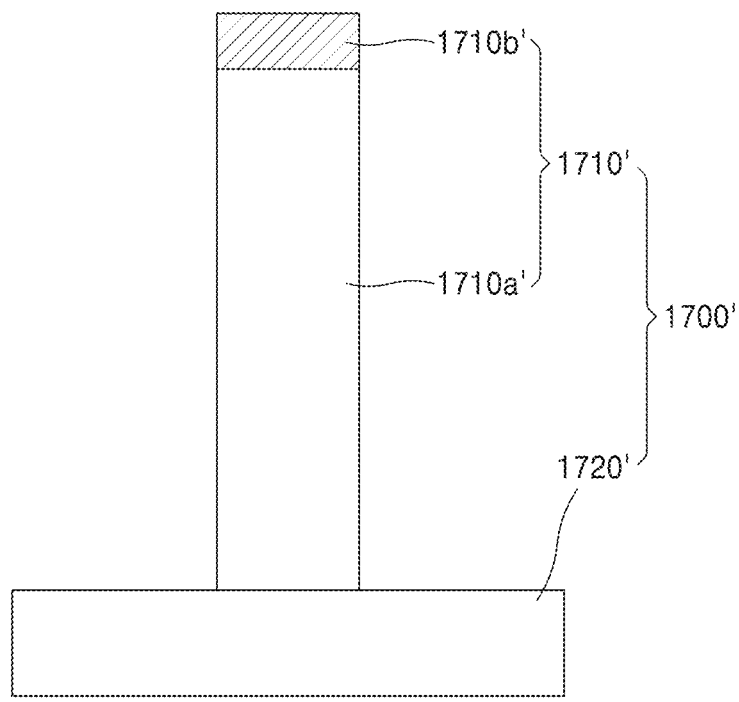

FIGS. 18A and 18B are diagrams illustrating the support unit of the information output apparatus of FIG. 15 and a modified example of the support unit, respectively.

Referring to FIG. 18A, as described above, the support unit 1700 of the present embodiment includes the body portion 1720, and the body portion 1720 may be disposed to be connected to the extension portion 1710 and to support the coil unit 1200.

Further, as a modified example, referring to FIG. 18B, a support unit 0'1700' includes a body portion 1720', and the body portion 1720' may be disposed to be connected to an extension portion 1710' and to support the coil unit 1200. In addition, an upper end member 1710*b*0' may be formed on one end of the extension portion 1710', and the upper end member 171*b*0' may be made of a material different from that of the extension portion 1710'.

In an alternative embodiment, the upper end member 171*b*0' may include a material such as a plastic, a ceramic, or the like. For example, the extension portion 1710' may include a magnetic material and the upper end member 171*b*0' may include a plastic material.

The embodiment illustrated with reference to FIG. 18B is selectively applicable to all other embodiments of the present specification.

Figure 19A:
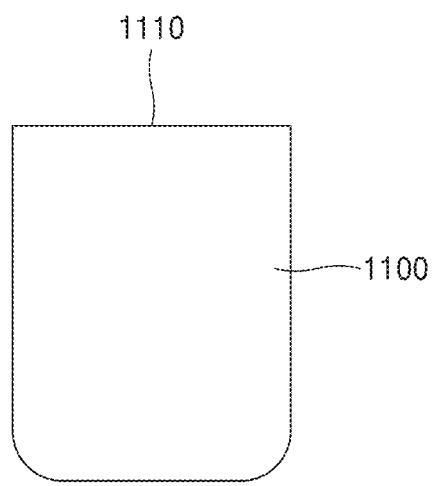
FIGS. 19A and 19B are diagrams illustrating an expression unit of the information output apparatus of FIG. 15 and a modified example of the expression unit, respectively.
Figure 19B:
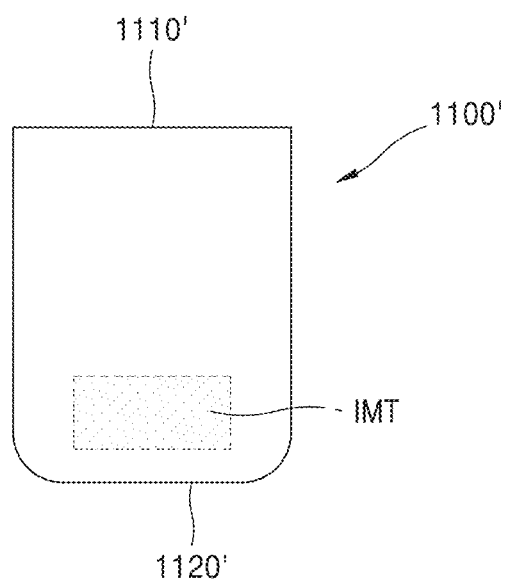

FIGS. 19A and 19B are diagrams illustrating the expression unit of the information output apparatus of FIG. 15 and a modified example of the expression unit, respectively.

Referring to FIG. 19A, the above-described expression unit 1100 of the present embodiment may include the expression surface 1110 and the support surface 1120.

Further, as a modified example, referring to FIG. 19B, an expression unit 1100' may include an expression surface 1110' and a support surface 1120', and may include a magnetic body IMT therein. The driving of the expression unit 1100' through the driving unit 1400 may be more efficiently performed using the magnetic body IMT of the expression unit 1100', thereby reducing the power consumption.

The embodiment illustrated with reference to FIG. 19B is selectively applicable to all other embodiments of the present specification.

Figure 20:
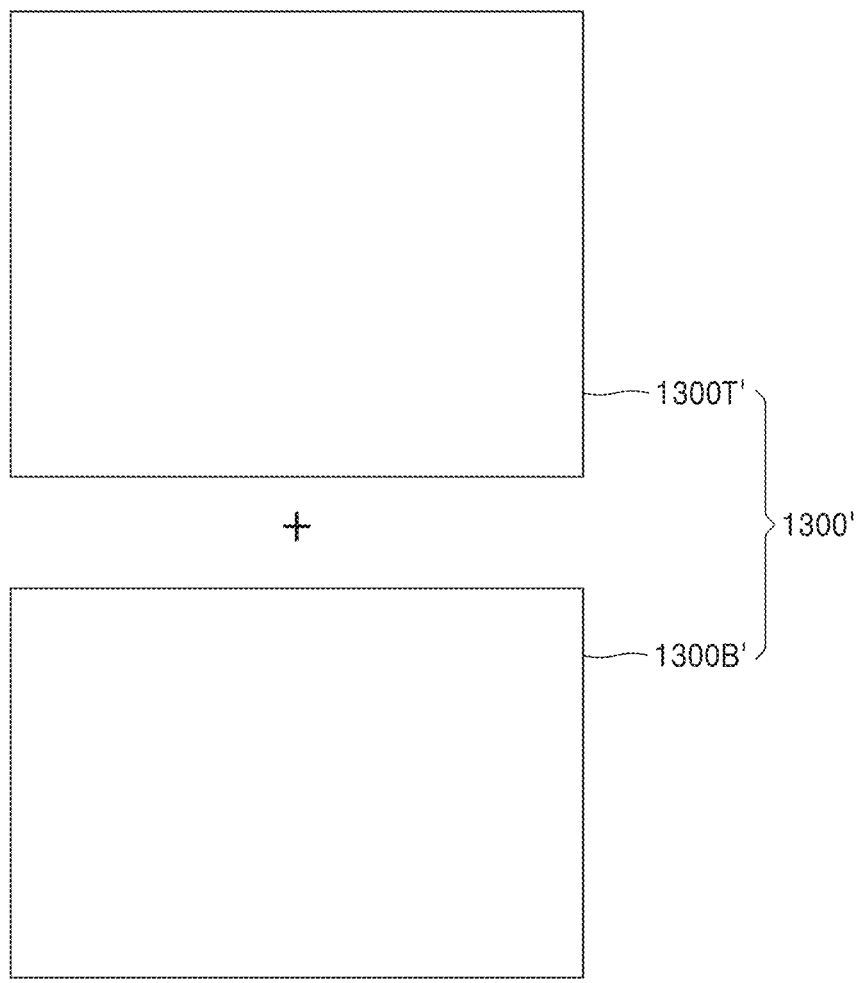
FIG. 20 is a diagram illustrating a modified example of a base unit of the information output apparatus of FIG. 15.

FIG. 20 is a diagram illustrating a modified example of the base unit of the information output apparatus of FIG. 15.

Referring to FIG. 20, a base unit 1300' of the present embodiment may include a top base member 1300T' and a bottom base member 1300B'. The base unit 1300' is formed to be separated into upper and lower portions, and the top base member 1300T' and the bottom base member 1300B' may include a first accommodation part and a second accommodation part, respectively.

Accordingly, the corresponding member, that is, the driving unit, the coil unit, the support unit, or the expression unit may be easily disposed in each of the first accommodation part and the second accommodation part of the top base member 1300T' and the bottom base member 1300B'.

In an alternative embodiment, the information output apparatus is manufactured in such a manner that the driving unit, the coil unit, the support unit, or the expression unit is disposed in each of the first accommodation part of the bottom base member 1300B' and the second accommodation part of the top base member 1300T', and then the top base member 1300T' is coupled to the bottom base member 1300B', thereby improving convenience in manufacturing operations.

The embodiment illustrated with reference to FIG. 20 is selectively applicable to all other embodiments of the present specification.

FIGS. 21 to 24 are diagrams for describing operations of the information output apparatus of FIG. 15.

Figure 21:
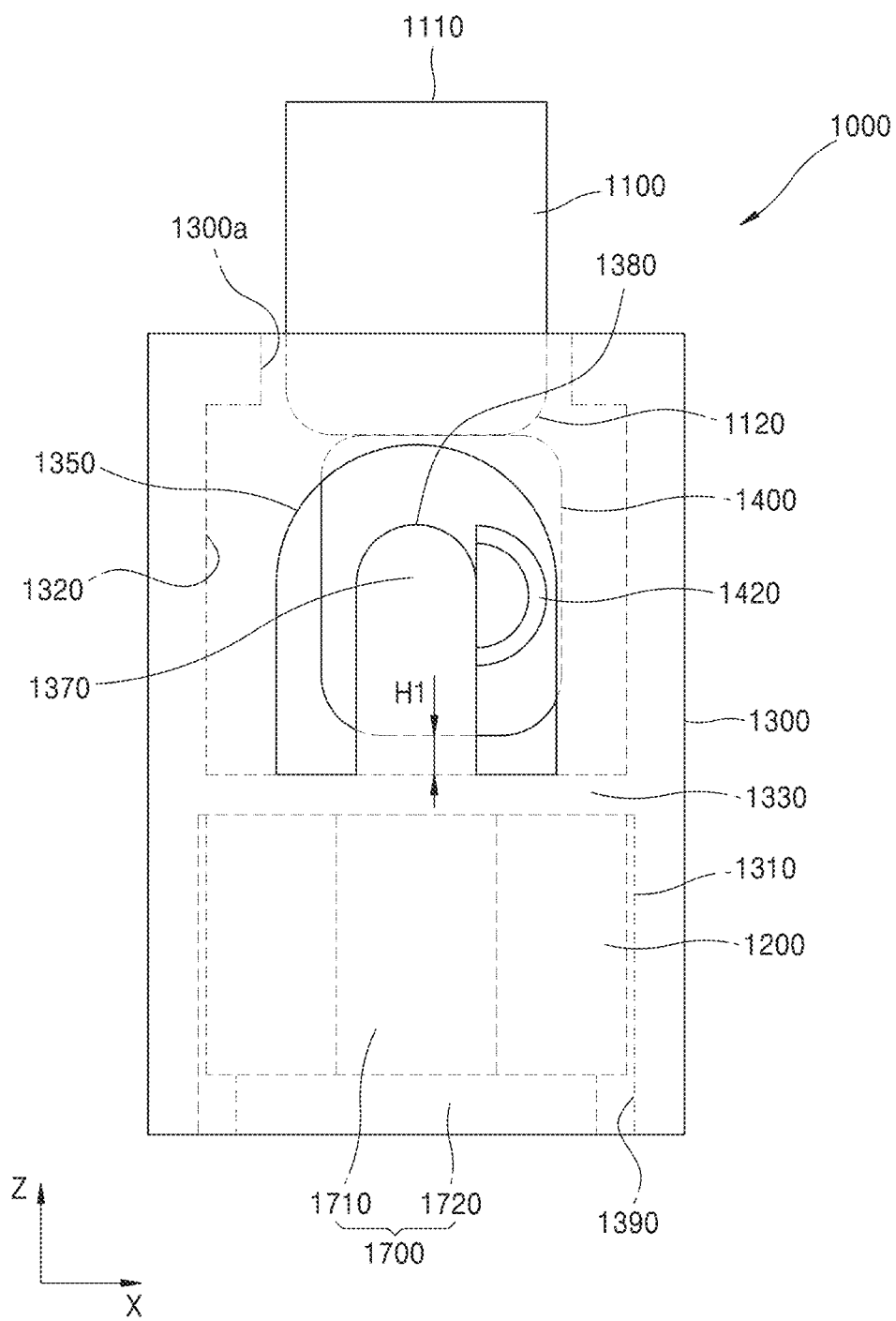
FIGS. 21 to 24 are diagrams for describing operations of the information output apparatus of FIG. 15.

Referring to FIG. 21, it is illustrated that the driving unit 1400 is raised with respect to the position of the coil unit 1200 as compared to that in FIG. 15, and accordingly, the expression unit 1100 moves upward.

For example, when a current is applied to the coil unit 1200 and a magnetic field is formed, the driving unit 1400 may move, for example, when a repulsive force acts on the first region 1510 of the magnetic unit 1500 disposed on the driving unit 1400, the driving unit 1400 may be raised by the repulsive force acted on the magnetic unit 1500. For example, the driving unit 1400 may be raised by as much as a height H1.

Figure 22:
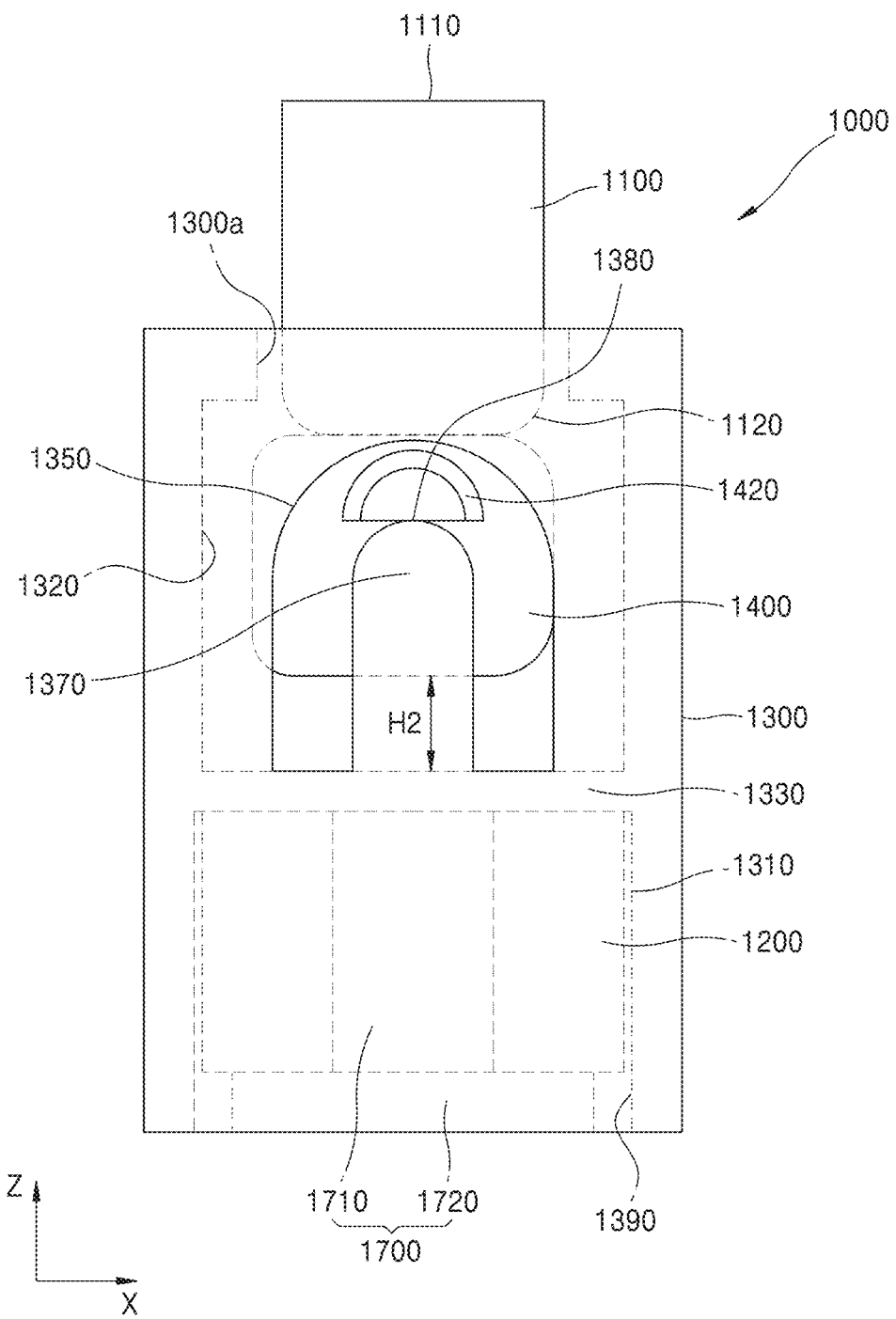

After that, referring to FIG. 22, it is illustrated that the driving unit 1400 continues to move due the magnetic field formed by the coil unit 1200, that is, a repulsive force acts on the first region 1510 of the magnetic unit 1500 and an attractive force acts on the second region 1520, and thus the driving unit 1400 performs an angular movement while moving upward.

In this case, since the driving control part 1420 moves within the guide groove 1350, the driving control part 1420 may be disposed on the upper surface 1380 of the intermediate portion 1370.

Due to such driving of the driving unit 1400, the expression unit 1100 may be further raised with respect to the position of the coil unit 1200 as compared to that in FIG. 21.

Figure 23:
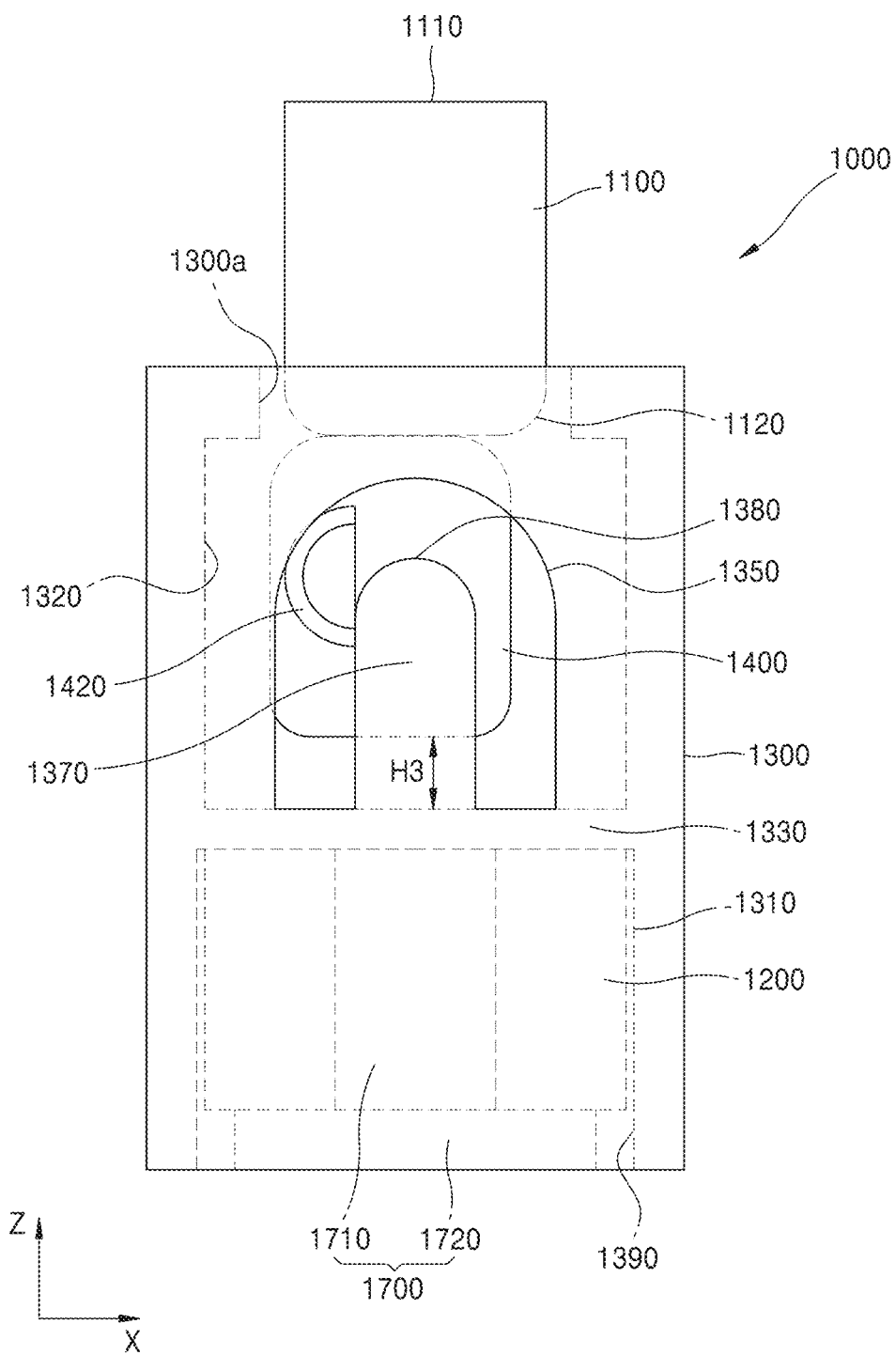

After that, referring to FIG. 23, due to the magnetic field formed by the coil unit 1200, the driving unit 1400 continues to move. That is, a repulsive force acts on the first region 1510 of the magnetic unit 1500 and an attractive force acts on the second region 1520. Thus the first region 1510 and the second region 1520 are turned over, that is, the first region 1510 is disposed far from the coil unit 1200, and the second region 1520 is disposed to face the coil unit 1200.

In this case, since the driving control part 1420 moves within the guide groove 1350, the driving control part 1420 may be disposed in the second groove 1350*b* of the guide groove 1350.

Due to such driving of the driving unit 1400, the expression unit 1100 may be further raised with respect to the position of the coil unit 1200 as compared to that in FIG. 21, and the expression unit 1100 may be at the highest point depending on the shape of the driving unit 1400.

Figure 24:
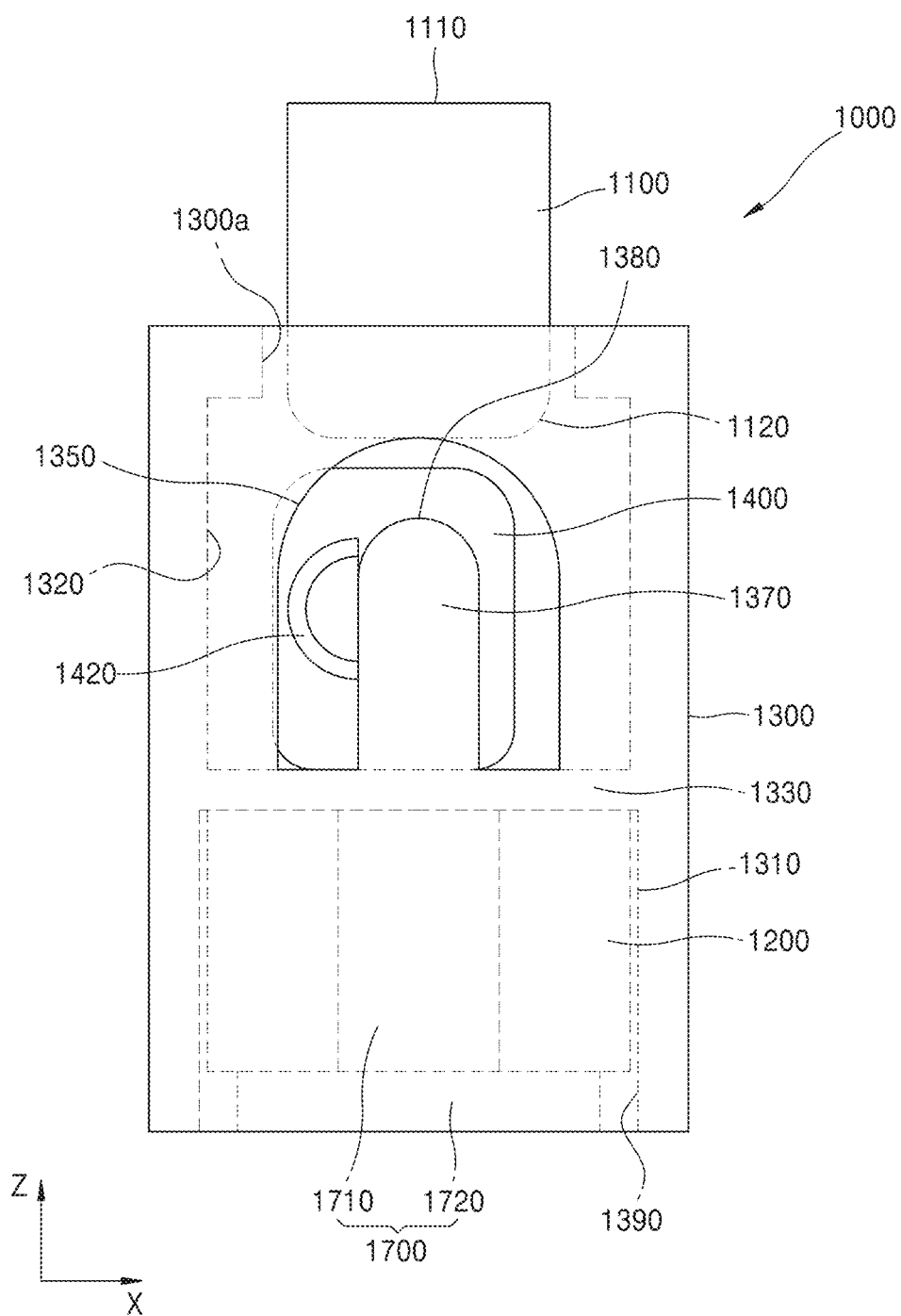

After that, referring to FIG. 24, the driving control part 1420 may be further lowered as compared to that in FIG. 23 and disposed in the second groove 1350*b* of the guide groove 1350 in the guide groove 1350.

Due to such driving of the driving unit 1400, the expression unit 1100 may be at the same position as that in FIG. 21, for example, at the lowest point with respect to the position of the coil unit 1200.

On the basis of FIG. 23, such movement illustrated in FIG. 24 may be that the driving unit 1400 continues to move due to the magnetic field formed by the coil unit 1200, that is, a repulsive force acts on the first region 1510 of the first magnetic unit 1500 and an attractive force acts on the second region 1520 thereof.

Further, as another example, in FIG. 23, since the driving unit 1400 is in a state of being already raised and the driving control part 1420 starts to be disposed in the second groove 1350b, the driving unit 1400 may be lowered by gravity even when a separate magnetic field through the coil unit 1200 does not exist.

Accordingly, the power for driving the driving unit 1400 may be reduced.

The information output apparatus according to the present embodiment may include one or more information output units, the driving unit of the information output unit may move at least in the first direction and a direction opposite thereto, and the expression unit may also move in the first direction or the direction opposite thereto according to the movement of the driving unit, thereby outputting various pieces of information which may be sensed by a user.

For example, the information output apparatus according to the present embodiment may be an information output apparatus in which, when the expression unit protrudes, the user senses the surface of the expression unit through a tactile sense. More particularly, for example, information may be output in the form of Braille output.

In an alternative embodiment, the information output apparatus may be a visually-sensing type information output apparatus in which, when the expression unit protrudes, the user may visually sense the protrusion. Particularly, when a color is formed on one surface of the expression unit, for example, an upper surface, or when one surface of the expression unit is formed to emit light, the visual sensing effect may be increased.

Accordingly, the information output apparatus according to the present embodiment may output information to a user, and in an alternative embodiment, the information output apparatus according to the present embodiment may output various pieces of information to the user when the information output apparatus includes a plurality of information output units.

Further, in more detail, the driving unit may be easily moved in the first direction by the magnetic field formed by the coil unit, for example, may be raised.

For example, when a repulsive force is generated by the magnetic field, which is formed by the coil unit according to polarities of the magnetic unit disposed in the driving unit, the driving unit may move upward while performing the angular or rotational movement. In this case, the driving control part disposed in the driving unit may be easily raised and lowered according to the shape of the guide groove, and in an alternative embodiment, the driving control part may be moved along a smooth path according to the curved or circular arc shape of the connection groove of the guide groove.

Accordingly, the moving up and down of the driving unit may be performed softly, naturally, and precisely, and accordingly, an irregular intermittence in moving up and down of the expression unit may be reduced. In addition, the soft, natural, and precise movement may be easily controlled.

Since the expression unit moves up and down, an ON-state or an OFF-state of the information output apparatus may be easily implemented.

Further, in an alternative embodiment, the driving control part may be raised and disposed on the upper surface of the intermediate portion, and in this case, even when a force such as a magnetic field through the coil unit is not applied to the driving unit, the driving unit may be maintained in the current state.

Further, when the driving control part starts to move to the second groove of the guide groove by the magnetic field in the opposite direction formed by the coil unit, the driving unit may be lowered by gravity even when power, or current or voltage applied to the coil unit is removed.

Accordingly, an ON state and an OFF state of the expression unit of the information output apparatus may be easily switched and maintained, power consumption for the movement of the expression unit may be reduced, and the overall energy efficiency of the information output apparatus may be improved.

Further, the magnetic unit and the coil unit provided in the driving unit of the present embodiment are disposed such that the central axis of the magnetic unit and the central axis of the coil unit are deviated from each other, that is, eccentrically disposed, so that, when the driving unit is driven by the magnetic field, torque may be easily generated in the driving unit. In addition, the driving unit is raised and lowered through the angular or rotational movement of the driving unit, and thus, the movement of the expression unit may be controlled precisely, smoothly, and naturally.

In an alternative embodiment, the magnetic unit provided in the driving unit may be disposed to overlap the driving control part, for example, the center of the magnetic unit may overlap the driving control part.

Accordingly, when the driving unit moves, a change in position of the magnetic unit with respect to the driving control part may be reduced, and the non-uniformity in the effect of the magnetic field, which is formed by the coil unit, on the magnetic unit may be reduced, so that it is possible to easily perform precise control of the movement of the driving unit.

Figure 25:
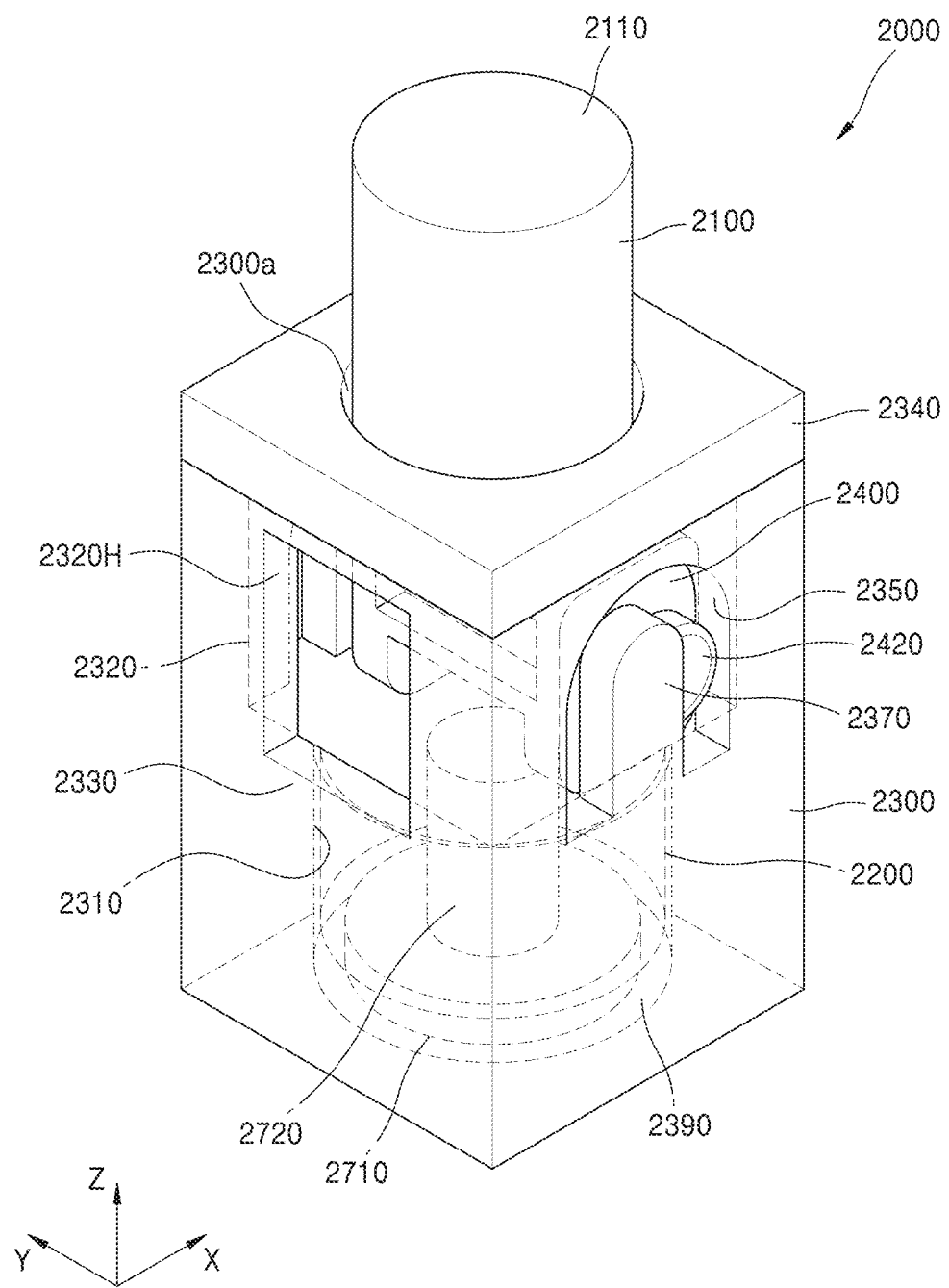
FIG. 25 is a perspective view schematically illustrating an information output apparatus according to yet an embodiment of the present disclosure.
Figure 26:
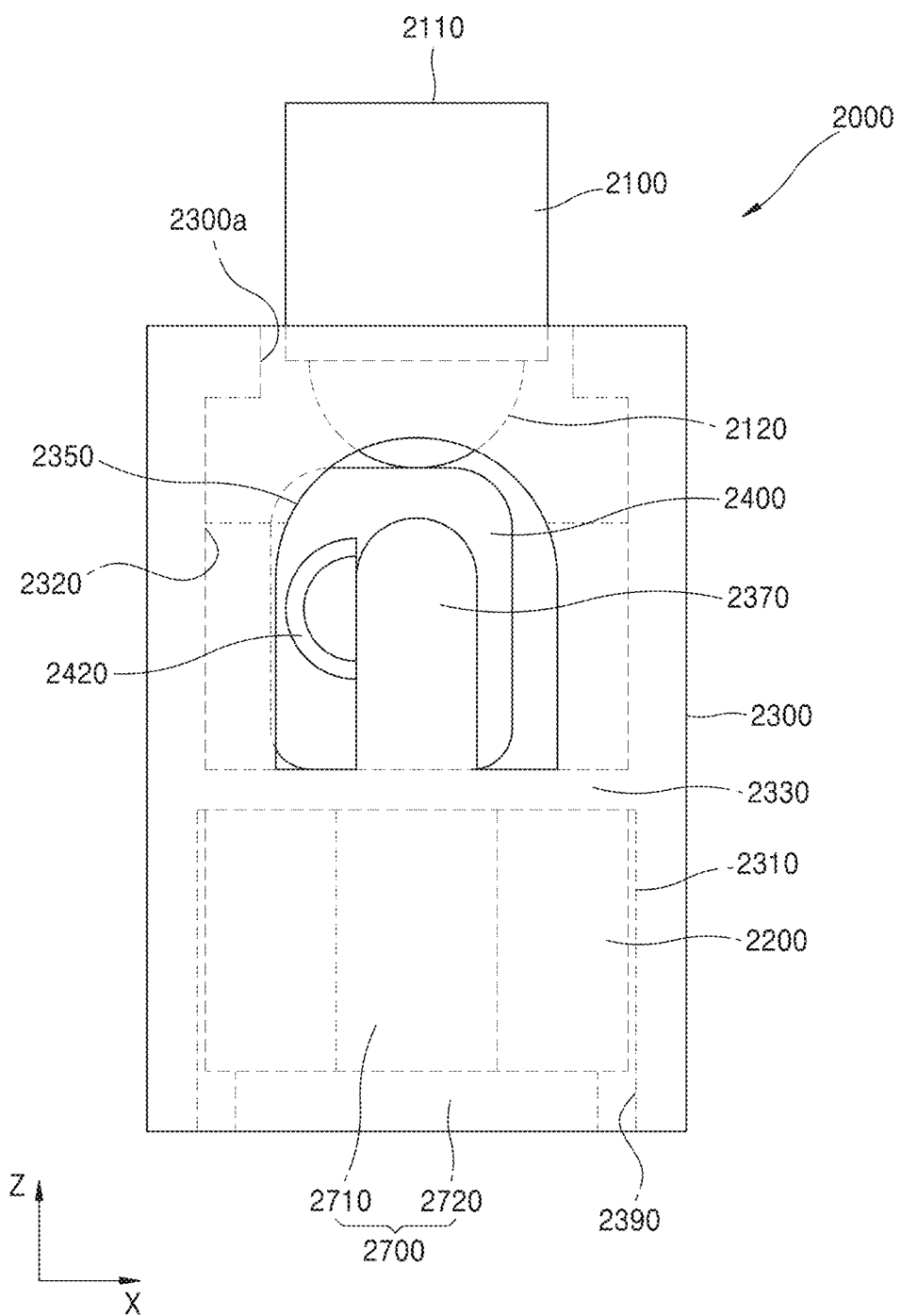
FIG. 26 is a schematic front view of FIG. 25 when viewed from one direction.
Figure 27:
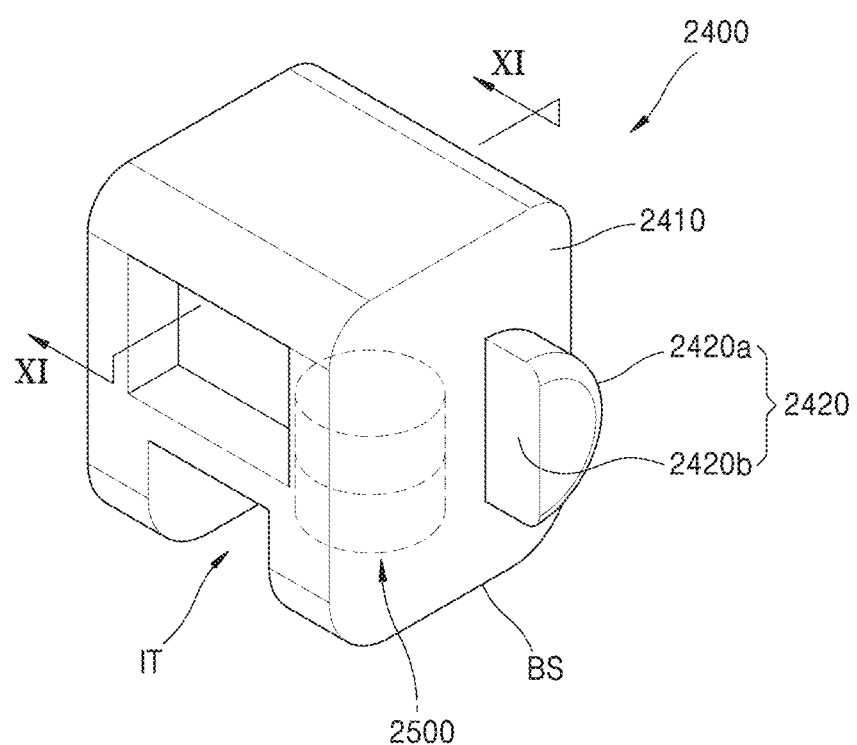
FIG. 27 is a diagram for describing a driving unit of the information output apparatus of FIG. 25.
Figure 28:
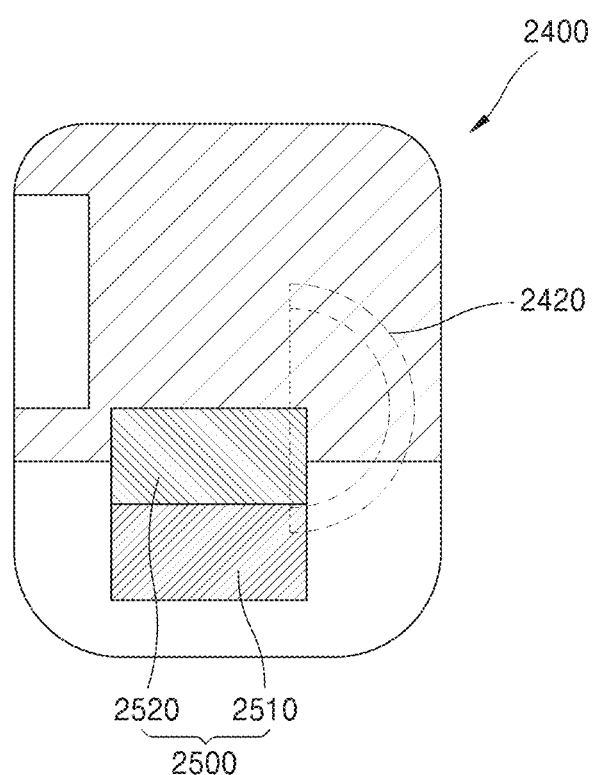
FIG. 28 is a cross-sectional view taken along line XI-XI of FIG. 27.

FIG. 25 is a perspective view schematically illustrating an information output apparatus according to yet an embodiment of the present disclosure, FIG. 26 is a schematic front view of FIG. 25 when viewed from one direction, FIG. 27 is a diagram for describing a driving unit of the information output apparatus of FIG. 25, and FIG. 28 is a cross-sectional view taken along line XI-XI of FIG. 27.

For convenience of description, descriptions will be made focusing on the contents different from those of the above-described embodiments.

Referring to FIG. 25 to FIG. 28, an information output apparatus 2000 of the present embodiment includes at least one information output unit, and FIG. 25 illustrates one information output unit. That is, the information output apparatus 2000 of FIG. 25 may be one information output unit.

One information output unit is illustrated in FIG. 25, but in an alternative embodiment, the information output apparatus 2000 may include two or three or more information output units.

That is, the information output apparatus 2000 may include various numbers of information output units according to purposes, characteristics of applied products, and user characteristics.

For convenience of description, an information output apparatus including one information output unit as shown in FIG. 25 will be described.

The information output apparatus 2000 may include a coil unit 2200, a base unit 2300, a driving unit 2400, and an expression unit 2100.

The base unit 2300 may include one or more guide grooves 2350.

The expression unit 2100 may move according to the movement of the driving unit 2400, which will be described below, and may move downward and upward with respect to a lengthwise direction of the expression unit 2100. For example, the expression unit 2100 may move in one direction toward the coil unit 2200 and a direction opposite thereto.

Accordingly, the expression unit 2100 may move to protrude in one direction, and a user may sense the movement of the expression unit 2100 through a tactile or visual sense.

The expression unit 2100 may include an expression surface 2110 and a support surface 2120.

The support surface 2120 is a surface of the expression unit 2100 facing the driving unit 2400, and may form a lower region of the expression unit 2100 and may be in contact with the driving unit 2400. The driving unit 2400 may transmit power to the expression unit 2100 through the support surface 2120. For example, a driving surface of the driving unit 2400 may be in contact with the support surface 2120 to move the support surface 2120 in a first direction, that is, a Z-axis direction in FIG. 25.

In an alternative embodiment, the support surface 2120 may include a curved surface, and accordingly, a driving force may be flexibly transmitted through the driving unit 2400.

In an alternative embodiment, the support surface 2120 may have a shape like a convex portion having a width smaller than that of a body region of the expression unit 2100, and in an alternative embodiment, may have a shape of some regions of a sphere.

The expression surface 2110 is an outermost side of the expression unit 2100, for example, a region of the expression unit 2100 farthest from the coil unit 2200, and may include a region recognized by a user.

For example, the user may recognize the entire region of the expression unit 2100, but may also recognize only the expression surface 2110. For example, the user may sense the movement of the expression unit 2100 by contacting the expression surface 2110, and also may easily sense the movement of the expression unit 2100 by visually sensing the expression surface 2110.

In an alternative embodiment, the expression surface 2110 may include a curved surface.

The expression unit 2100 may have various shapes and may include a pillar-shaped region, for example, a region having an approximately cylindrical shape.

Further, in an alternative embodiment, a protruding region of the expression unit 2100 may have a curved surface or curved corners.

The expression unit 2100 may include various materials or may be made of an insulating material that is light-weight and has an excellent durability. For example, the expression unit 2100 may include a resin-based organic material. In another example, the expression unit 2100 may include an inorganic material like a ceramic.

Further, in another alternative embodiment, the expression unit 2100 may be made of a metal or glass material.

The coil unit 2200 may be formed to be connected to an external power supply (not shown). When a current flows in the coil unit 2200, a magnetic field may be formed around the coil unit 2200.

The coil unit 2200 may have various shapes, for example, the coil unit 2200 may have a shape in which an electric wire is wound a plurality of times, and the number of times that the electric wire is wound may be variously adjusted.

Due to a magnetic field formed by the current flowing in the coil unit 2200, the driving unit 2400 may move, and the movement of the driving unit 2400 may provide a driving force that enables the expression unit 2100 to move.

In an alternative embodiment, a support unit 2700 may be further disposed, and the support unit 2700 may be disposed such that at least one region thereof may be adjacent to or support the coil unit 2200.

For example, the support unit 2700 includes an extension member 2710, and may be disposed such that the extension member 2710 passes through the coil unit 2200, and as a specific example, the support unit 2700 may have a shape in which a plurality of coils of the coil unit 2200 are wound around the extension member 2710.

In an alternative embodiment, one end of the extension member 2710 may be elongated to overlap one region of the driving unit 2400 to be described below, or may be formed to support the one region.

In an alternative embodiment, the support unit 2700 includes a body member 2720, and the extension member 2710 may be connected to the body member 2720.

As a specific example, the extension member 2710 may have a shape extending long in a direction close to the expression unit 2100 from the body member 2720.

In an alternative embodiment, the coil unit 2200 may include coils in a shape wound around the extension member 2710 on the body member 2720.

In an alternative embodiment, the body member 2720 and the extension member 2710 of the support unit 2700 may be integrally formed.

In an alternative embodiment, although not shown in the drawings, the support unit 2700 may further include a supporting portion (not shown) to support the body member 2720, and the body member 2720 may be disposed on the supporting portion (not shown).

The base unit 2300 may be formed to accommodate the coil unit 2200. For example, the base unit 2300 may include a first accommodation portion 2310, a second accommodation portion 2320, and the guide grooves 2350.

The first accommodation portion 2310 and the second accommodation portion 2320 may be disposed to be adjacent to each other and may be disposed not to overlap each other.

In an alternative embodiment, the first accommodation portion 2310 may be spaced apart from the second accommodation portion 2320.

In another alternative embodiment, the first accommodation portion 2310 may be connected to the second accommodation portion 2320 through a through hole.

The coil unit 2200 may be disposed in the first accommodation portion 2310.

In an alternative embodiment, the above-described support unit 2700 may be disposed in the first accommodation portion 2310, and in another alternative embodiment, although not shown in the drawings, one region of the support unit 2700, for example, one region of the extension member 2710 may be elongated and disposed up to the second accommodation portion 2320 through the through hole.

The guide grooves 2350 may be formed in the second accommodation portion 2320. For example, the guide grooves 2350 may be formed on both inner side surfaces of the second accommodation portion 2320 of the base unit 2300 facing each other, and in another alternative embodiment, the guide groove 2350 may be formed only on one inner side surface thereof.

The guide groove 2350 may have a through-hole shape, and as another example, may have a groove shape that is not exposed to the outside of the base unit 2300.

The contents of the guide groove 2350 are the same as those of the embodiment described with reference to FIG. 17, and thus a detailed description thereof will be omitted.

Further, the contents of an intermediate portion 2370 and an upper surface of the intermediate portion 2370 are also the same as those of the above-described embodiment, and thus a description thereof will be omitted.

The base unit 2300 may have a shape extending long to accommodate the coil unit 2200 and the driving unit 2400, or may be formed to entirely surround both the coil unit 2200 and the driving unit 2400.

In an alternative embodiment, the base unit 2300 may include a boundary 2330 between the first accommodation portion 2310 and the second accommodation portion 2320.

The first accommodation portion 2310 may be separated from the second accommodation portion 2320 through the boundary 2330.

In an alternative embodiment, although not shown in the drawings, a through hole may be formed in the boundary 2330, and the through hole may be disposed such that one region of the support unit 2700 extends and passes therethrough.

Further, the base unit 2300 includes an entry 2300a, and the entry 2300a may be connected to the second accommodation portion 2320. The expression unit 2100 may move through the entry 2300a such that a length at which the expression unit 2100 protrudes to the outside of the base unit 2300 is changed.

In an alternative embodiment, the base unit 2300 may include an open region 2390, and specifically, the open region 2390 may be formed to be connected to the first accommodation portion 2310.

The support unit 2700 and the coil unit 2200 may be easily disposed, replaced, or repaired through the open region 2390.

In an alternative embodiment, a window 2320H may be formed, which is connected to one region of the second accommodation portion 2320 of the base unit 2300. Through the window 2320H, the state of the second accommodation portion 2320, for example, the state or operation of the driving unit 2400 may be confirmed or inspected even when the expression unit 2100 is not separated.

In another alternative embodiment, the width and height of the window 2320H may be greater than or at least equal to the width and height of the driving unit 2400. Accordingly, if necessary, the driving unit 2400 may be easily pulled out or inserted through the window 2320H, and may also be easily replaced, repaired, or inspected.

The driving unit 2400 may be disposed in the base unit 2300. The driving unit 2400 may be disposed in the second accommodation portion 2320 and may be spaced apart from the coil unit 2200 that is disposed in the first accommodation portion 2310.

The driving unit 2400 may be disposed to be adjacent to the coil unit 2200, and may be driven by a current flowing in the coil unit 2200 to perform an angular movement or a rotational movement. The expression unit 2100 may move downward and upward, for example, in one direction toward the coil unit and a direction opposite thereto due to the driving unit 2400.

In an alternative embodiment, a magnetic unit 2500 may be disposed in the driving unit 2400, for example, at an inner space thereof. For example, the magnetic unit 2500 may include a magnetic material, and for example, may include a permanent magnet.

The magnetic unit 2500 may have a first region 2510 (e.g., an N-pole or an S-pole) and a second region 2520 (e.g., an S-pole or an N-pole), wherein the polarity of the first region 251 is different from the polarity of the second region 252, and the first region 2510 and the second region 2520 of different polarities may be arranged in a direction toward the expression unit 2100 from the coil unit 2200, for example, in the Z-axis direction, at one point during the rotation of the driving unit 2400.

In an alternative embodiment, when the driving unit 2400 is at the lowest point, the central axis of the magnetic unit 2500 and the central axis of the coil unit 2200 may not be aligned with each other and may be deviated from each other. Accordingly, when the driving unit 2400 is driven by the magnetic field formed by the coil unit 2200, torque may be generated in the driving unit 2400, and the driving unit 2400 may easily perform the rotational or angular movement.

In an alternative embodiment, an outer surface of driving unit 2400 may include a driving surface, and at least one region of the driving surface, for example, an edge region thereof may include a curved surface. In addition, the outer surface of the driving unit 2400 may be formed to support the expression unit 2100 and may provide a driving force for the downward and upward movement of the expression unit 2100.

In an alternative embodiment, the driving unit 2400 may have an approximately rectangular parallelepiped shape whose corners are treated as curved surfaces.

Further, in an alternative embodiment, one surface of the driving unit 2400 may have one or more grooves formed thereon, for example, may include two or more grooves. At least one groove includes a connection groove IT, and the connection groove IT is connected to a region in which the magnetic unit 2500 is disposed so that the magnetic unit 2500 may be partially exposed through the connection groove IT.

Further, in an alternative embodiment, the connection groove IT may have a width in one direction that is greater than or equal to that of the magnetic unit 2500, and thus, if desired, the magnetic unit 2500 may be inserted or pulled out through the connection groove IT.

The driving unit 2400 may include a driving control part 2420. Although not specifically shown in the drawings, in an alternative embodiment, the driving control parts 2420 may be disposed on both side surfaces of the driving unit 2400.

The position of the driving unit 2400 at the time of driving may be controlled through the driving control part 2420. For example, when the driving unit 2400 is moved by the coil unit 2200, the driving unit 2400 may move in a state in which the driving control part 2420 is disposed in the guide groove 2350.

In an alternative embodiment, the driving control part 2420 may move approximately along the shape of the guide groove 2350, for example, a shape similar to an alphabet letter "U."

The driving control part 2420 may have a protruding shape, for example, a shape protruding from a side surface of the driving unit 2400, and the driving control part 2420 may be disposed in the guide groove 2350.

In an alternative embodiment, the driving control part 2420 may include an outer side surface 2420a and an inner side surface 2420b.

The outer side surface 2420a is a surface facing an outer side surface of the guide groove 2350 when the driving unit 2400 is disposed in the guide groove 2350, for example, a surface close to an outer surface of the base unit 2300.

The inner side surface 2420b is a surface facing an inner side surface of the guide groove 2350, for example, the intermediate portion 2370, when the driving unit 2400 is disposed in the guide groove 2350.

In an alternative embodiment, the outer side surface 2420a may include a curved surface. Accordingly, when the driving unit 2400 moves within the guide groove 2350, the outer side surface 2420a may stably move through a first groove, the second groove, and the connection groove, and in an alternative embodiment, when the connection groove has a curved surface or at least one region of a circular arc shape, the friction between the connection groove and the outer side surface 2420a may be reduced, so that the driving unit 2400 may move smoothly, thereby improving efficiency.

In an alternative embodiment, at least one region of the inner side surface 2420b may have a flat surface. Accordingly, the driving unit 2400 may be stably moved, for example, when the driving control part 2420 is raised and disposed on an upper surface 2380 of the intermediate portion 2370, the driving control part 2420 may be stably placed on the upper surface 2380 of the intermediate portion 2370.

The information output apparatus according to the present embodiment may include one or more information output units, the driving unit of the information output unit may move at least in the first direction and a direction opposite thereto, and the expression unit may also move in the first direction or the direction opposite thereto according to the movement of the driving unit, thereby outputting various pieces of information which may be sensed by a user.

For example, the information output apparatus according to the present embodiment may be an information output apparatus in which, when the expression unit protrudes, the user senses the surface of the expression unit through a tactile sense. More particularly, for example, information may be output in the form of Braille output.

In an alternative embodiment, the information output apparatus may be a visually-sensing type information output apparatus in which, when the expression unit protrudes, the user may visually sense the protrusion. Particularly, when a color is formed on one surface of the expression unit, for example, an upper surface, or when one surface of the expression unit is formed to emit light, the visual sensing effect may be increased.

Accordingly, the information output apparatus according to the present embodiment may output information to a user, and in an alternative embodiment, the information output apparatus according to the present embodiment may output various pieces of information to the user when the information output apparatus includes a plurality of information output units.

Further, in more detail, the driving unit may be easily moved in the first direction by the magnetic field formed by the coil unit, for example, may be raised.

For example, when a repulsive force is generated by the magnetic field, which is formed by the coil unit according to polarities of the magnetic unit disposed in the driving unit, the driving unit may move upward while performing the angular or rotational movement. In this case, the driving control part disposed in the driving unit may be easily raised and lowered according to the shape of the guide groove, and in an alternative embodiment, the driving control part may be moved along a smooth path according to the curved or circular arc shape of the connection groove of the guide groove.

Accordingly, the moving up and down of the driving unit may be performed softly, naturally, and precisely, and accordingly, an irregular intermittence in moving up and down of the expression unit may be reduced. In addition, the soft, natural, and precise movement may be easily controlled.

Since the expression unit moves up and down, an ON-state or an OFF-state of the information output apparatus may be easily implemented.

Further, in an alternative embodiment, the driving control part may be raised and disposed on the upper surface of the intermediate portion, and in this case, even when a force such as a magnetic field through the coil unit is not applied to the driving unit, the driving unit may be maintained in the current state.

Further, when the driving control part starts to move to the second groove of the guide groove by the magnetic field in the opposite direction formed by the coil unit, the driving unit may be lowered by gravity even when power, or current or voltage applied to the coil unit is removed.

Accordingly, an ON state and an OFF state of the expression unit of the information output apparatus may be easily switched and maintained, power consumption for the movement of the expression unit may be reduced, and the overall energy efficiency of the information output apparatus may be improved.

Further, the magnetic unit and the coil unit provided in the driving unit of the present embodiment are disposed such that the central axis of the magnetic unit and the central axis of the coil unit are deviated from each other, that is, eccentrically disposed, so that, when the driving unit is driven by the magnetic field, torque may be easily generated in the driving unit. In addition, the driving unit is raised and lowered through the angular or rotational movement of the driving unit, and thus, the movement of the expression unit may be controlled precisely, smoothly, and naturally.

In an alternative embodiment, the magnetic unit provided in the driving unit may be disposed to overlap the driving control part, for example, the center of the magnetic unit may overlap the driving control part.

Accordingly, when the driving unit moves, a change in position of the magnetic unit with respect to the driving control part may be reduced, and the non-uniformity in the effect of the magnetic field, which is formed by the coil unit, on the magnetic unit may be reduced, so that it is possible to easily perform precise control of the movement of the driving unit.

Figure 29:
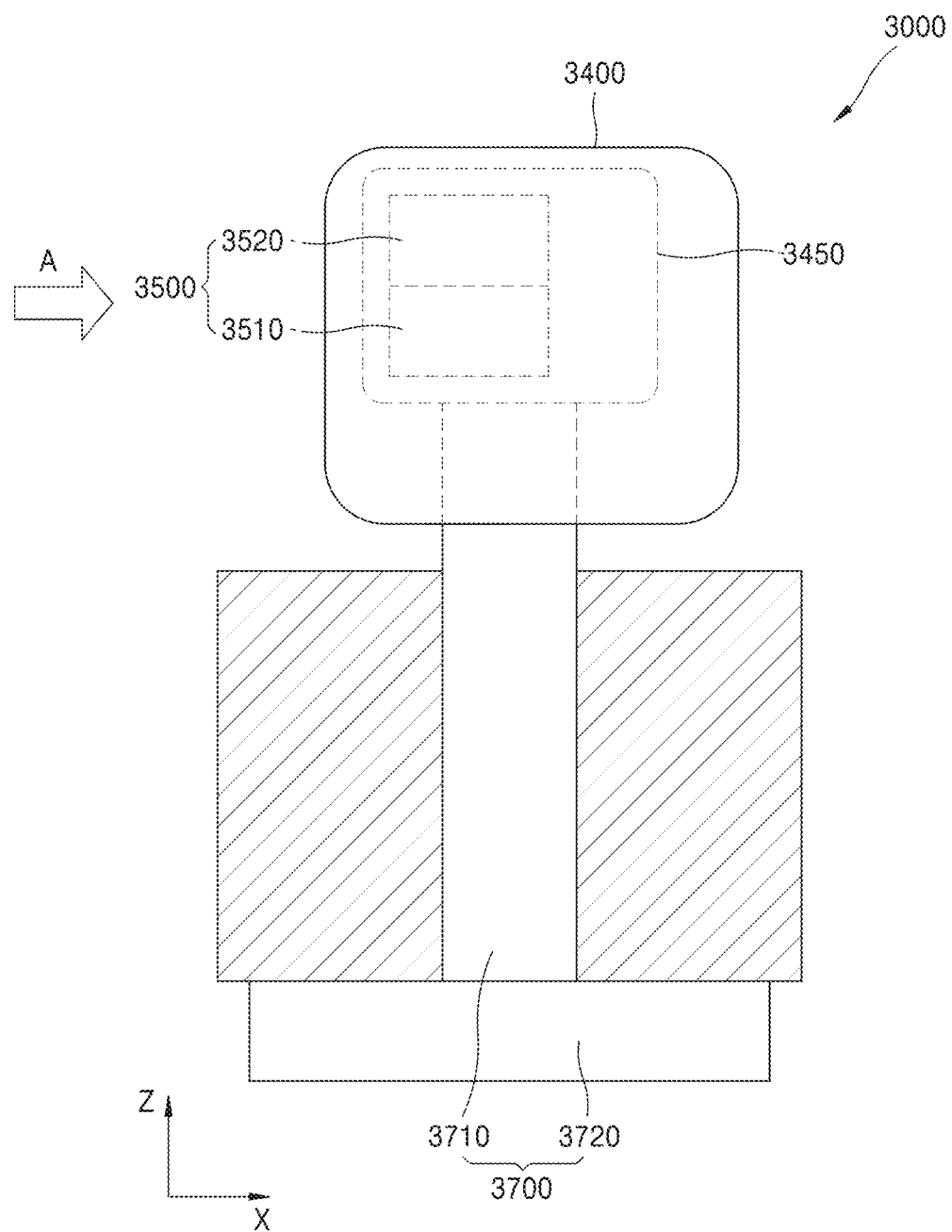
FIGS. 29 and 30 are front views schematically illustrating operations of an information output apparatus according to an embodiment of the present disclosure.
Figure 30:
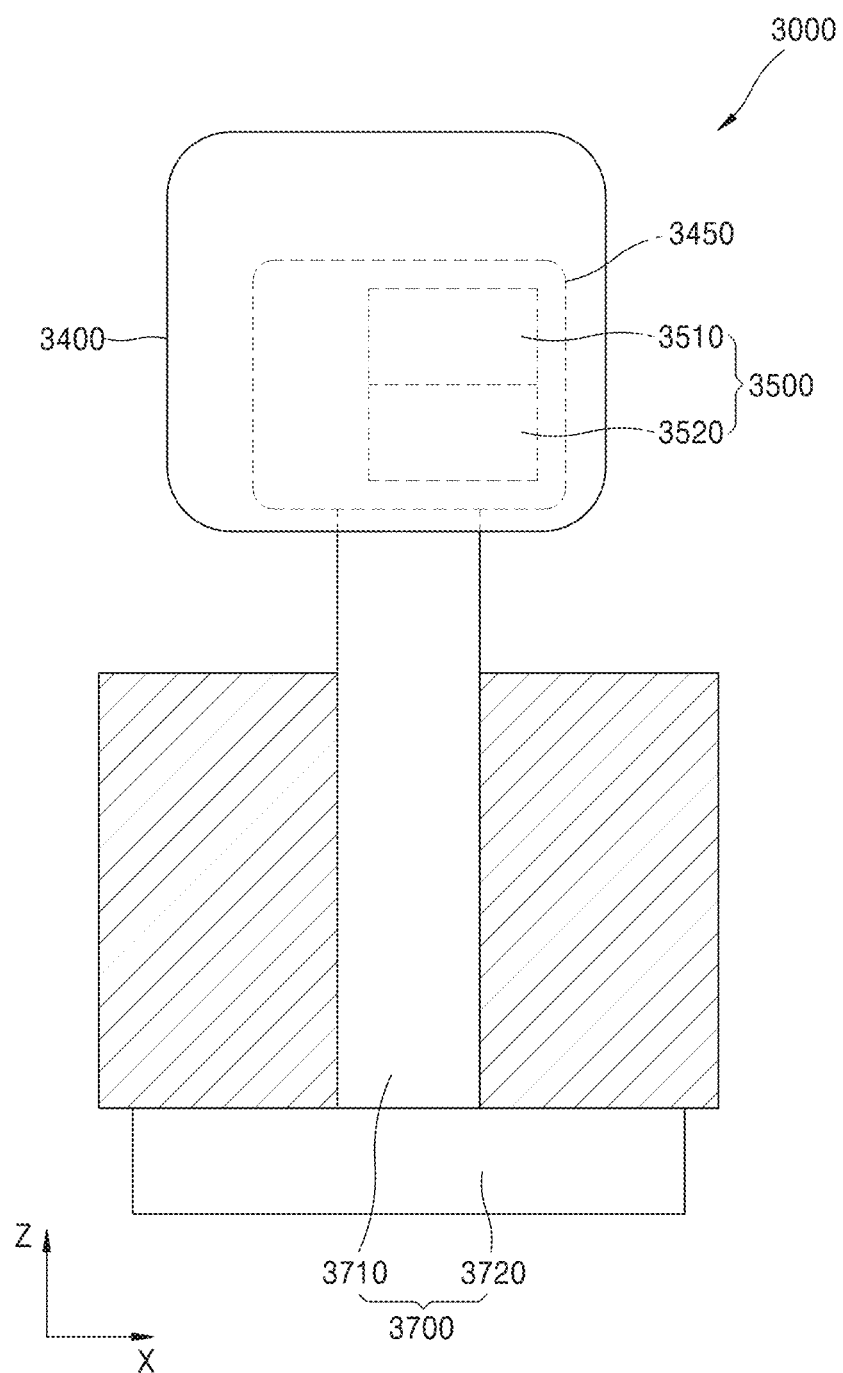
Figure 31:
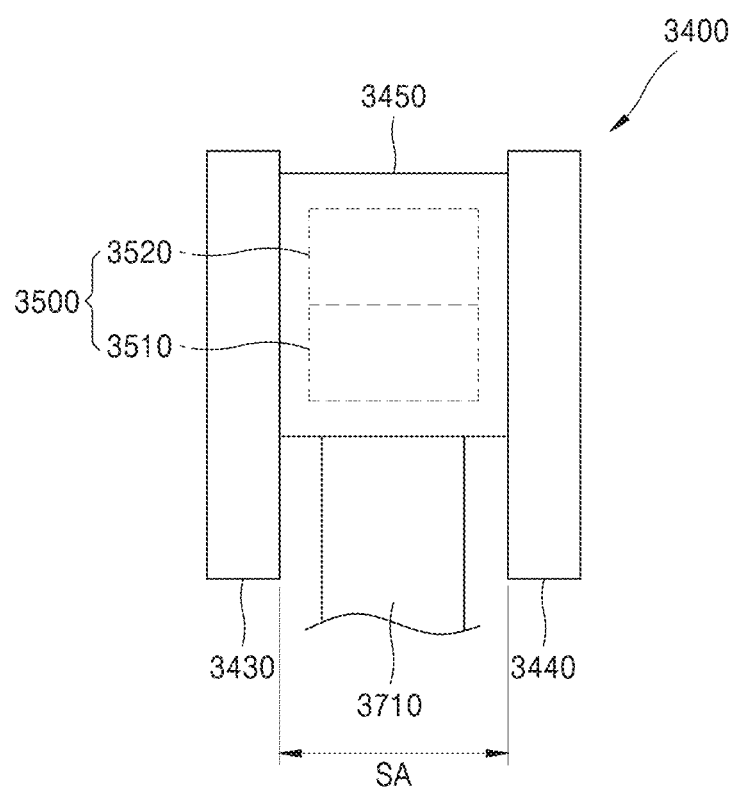
FIG. 31 is a side view of FIG. 29 when viewed from an arrow A.

FIGS. 29 and 30 are front views schematically illustrating operations of an information output apparatus according to an embodiment of the present disclosure, and FIG. 31 is a side view of FIG. 29 when viewed from an arrow A.

An information output apparatus 3000 of the present embodiment may include a coil unit 3200, a base unit (not shown), a driving unit 3400, and an expression unit (not shown).

For convenience of description, descriptions will be made focusing on the contents different from those of the above-described embodiments.

In addition, for convenience of description, the base unit and the expression unit are not illustrated in the drawings.

The coil unit 3200 may be formed to be connected to an external power supply (not shown). When a current flows in the coil unit 3200, a magnetic field may be formed around the coil unit 3200.

The coil unit 3200 may be disposed on a support unit 3700, and the support unit 3700 may be disposed such that at least one region thereof may be adjacent to or support the coil unit 3200.

For example, the support unit 3700 includes an extension member 3710, and may be disposed such that the extension member 3710 passes through the coil unit 3200, and as a specific example, the support unit 3700 may have a shape in which a plurality of coils of the coil unit 3200 are wound around the extension member 3710.

One end of the extension member 3710 may be elongated to overlap one region of the driving unit 3400 to be described below, or may be formed to support the one region.

In an alternative embodiment, the support unit 3700 includes a body member 3720, and the extension member 3710 may be connected to the body member 3720.

A magnetic unit 3500 may be disposed in an inner space of the driving unit 3400. For example, the magnetic unit 3500 may include a magnetic material, and for example, may include a permanent magnet.

The magnetic unit 3500 may have a first region 3510 (e.g., an N-pole or an S-pole) and a second region 3520 (e.g., an S-pole or an N-pole) of different polarities, and the first region 3510 and the second region 3520 of different polarities may be arranged in a direction toward the expression unit from the coil unit, for example, in the Z-axis direction, at one point during the rotation of the driving unit 3400.

The driving unit 3400 may include a first driving member 3430 and a second driving member 3440, and may include a separation space SA therebetween.

The first driving member 3430 and the second driving member 3440 may each include a driving surface on at least one outer surface thereof, and when the driving unit 3400 moves, the driving surfaces may support the expression unit and provide the expression unit with a driving power.

In an alternative embodiment, at least one region of the outer surface of each of the first driving member 3430 and the second driving member 3440 may have a curved surface, for example, an edge region of each of the first driving member 3430 and the second driving member 3440 may have a curved surface.

Accordingly, when the first driving member 3430 and the second driving member 3440 perform a rotation or angular movement, a width at which the expression unit rise and descend may be slightly varied, so that the expression unit may efficiently perform a continuous and natural movement.

Although not shown in the drawings, a driving control part (not shown) may be disposed on at least one side surface of each of the first driving member 3430 and the second driving member 3440, and for example, on each of side surfaces of the first driving member 3430 and the second driving member 3440 opposite to side surfaces thereof facing each other.

In an alternative embodiment, the driving control part (not shown) may have a protruding shape, and may have a structure that is the same as described in the aforementioned embodiment.

Further, in another alternative embodiment, the driving control part (not shown) may have may have a protruding shape similar to a circle or a cylinder rather than an approximately semi-circular shape of the above-described embodiment, and in this case, the guide groove (not shown) may have a groove shape extending in one direction, that is, in a Z-axis direction.

An adjacent driving part 3450 may be disposed in the separation space SA between the first driving member 3430 and the second driving member 3440.

In an alternative embodiment, the adjacent driving part 3450 may be disposed at a position overlapping the magnetic unit 3500.

In an alternative embodiment, the adjacent driving part 3450 may overlap a central axis of the coil unit 3200, and as a specific example, a central axis of the adjacent driving part 3450 may overlap the central axis of the coil unit 3200.

When the driving unit 3400 performs the rotational or angular movement, the adjacent driving part 3450 may be moved and supported together with the driving unit 3400. For example, the adjacent driving part 3450 may be supported by one end of the extension member 3710 of the support unit 3700. As another example, the base unit (not shown) may have a shape extending in a direction of the extension member 3710, and the extending region may support the adjacent driving part 3450.

The adjacent driving part 3450 may be formed to have a smaller width than each of the first driving member 3430 and the second driving member 3440, and the distance between an outer side surface of the adjacent driving part 3450 and an outer surface of each of the first driving member 3430 and the second driving member 3440 may be different for each region.

Accordingly, a height at which the driving unit 3400 moves may vary according to the angular or rotational movement of the driving unit 3400.

That is, the adjacent driving part 3450 of FIG. 30 performs a rotational movement, for example, has rotated 180° relative to that of FIG. 29, and accordingly, it is illustrated that the driving unit 3400 performs the rotational movement and an upward movement.

The driving unit of the information output apparatus of the present embodiment may include the adjacent driving part, the adjacent driving part may be supported while the driving unit performs the rotational or angular movement, and the distance between the adjacent driving part and the driving surface of the driving unit may be different for each region, so that the driving unit may be raised and lowered. In this case, only a groove extending in one direction may be included instead of the U-shaped guide groove, and may overlap the central axis of the coil unit.

Figure 32:
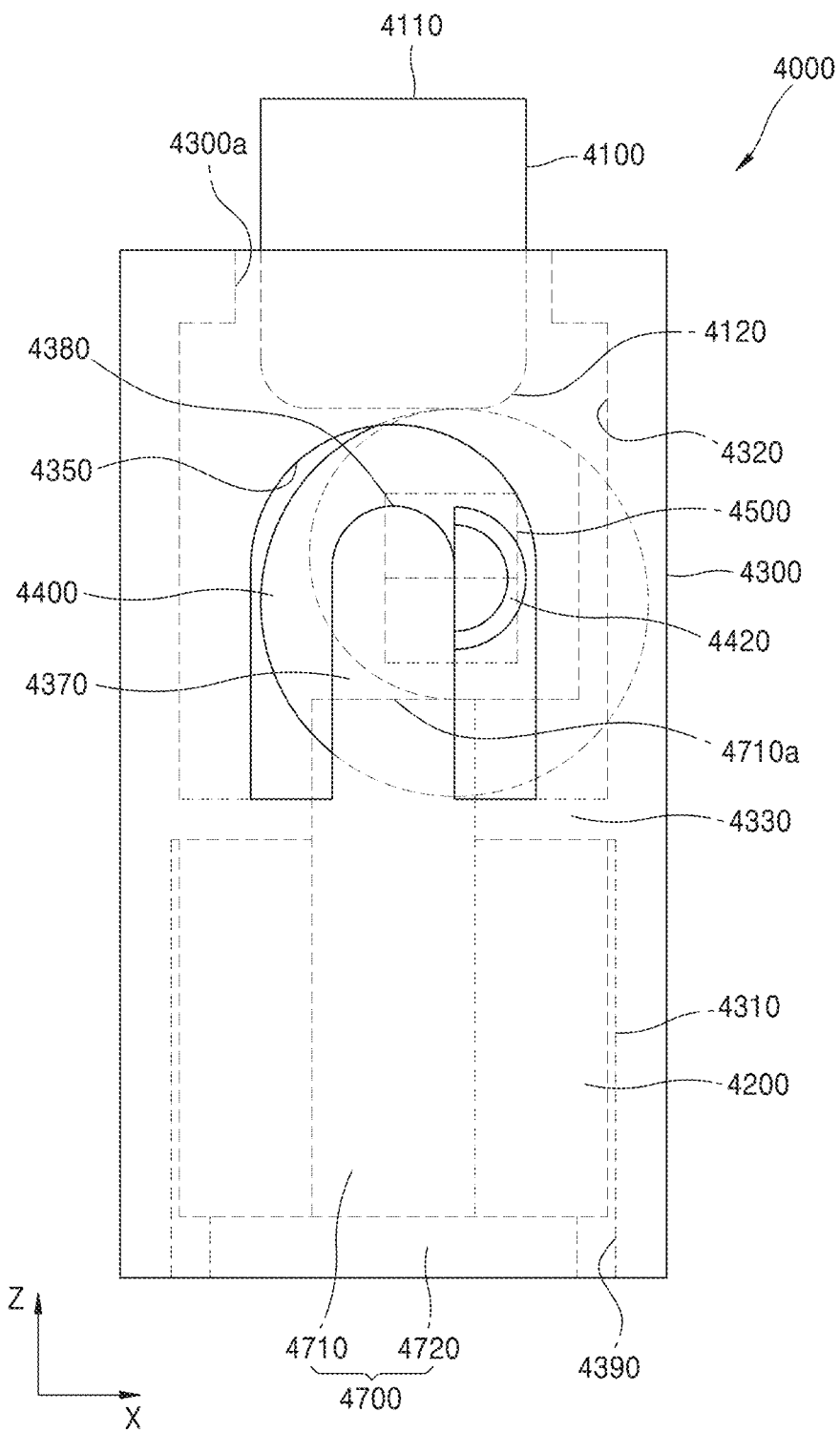
FIG. 32 is a front view schematically illustrating operations of an information output apparatus according to an embodiment of the present disclosure.
Figure 33:
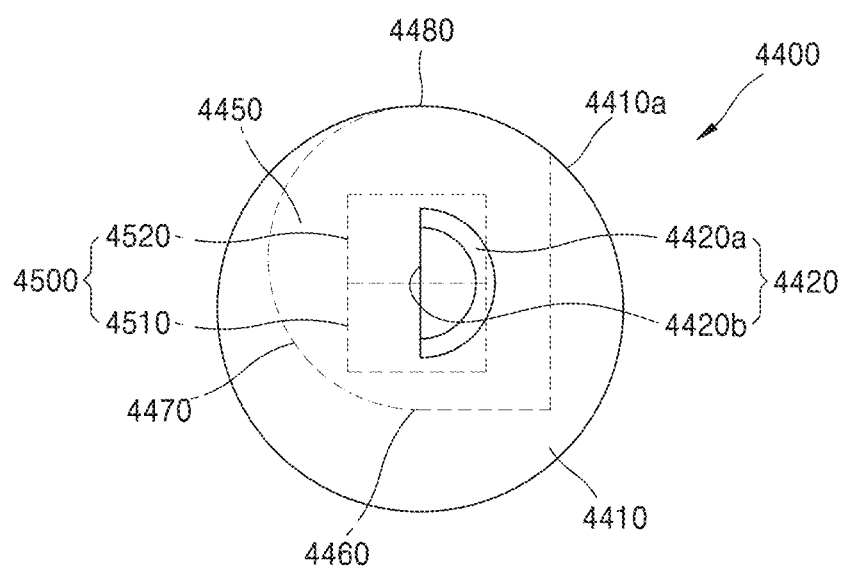
FIG. 33 is a diagram for describing a driving unit of FIG. 32.
Figure 34:
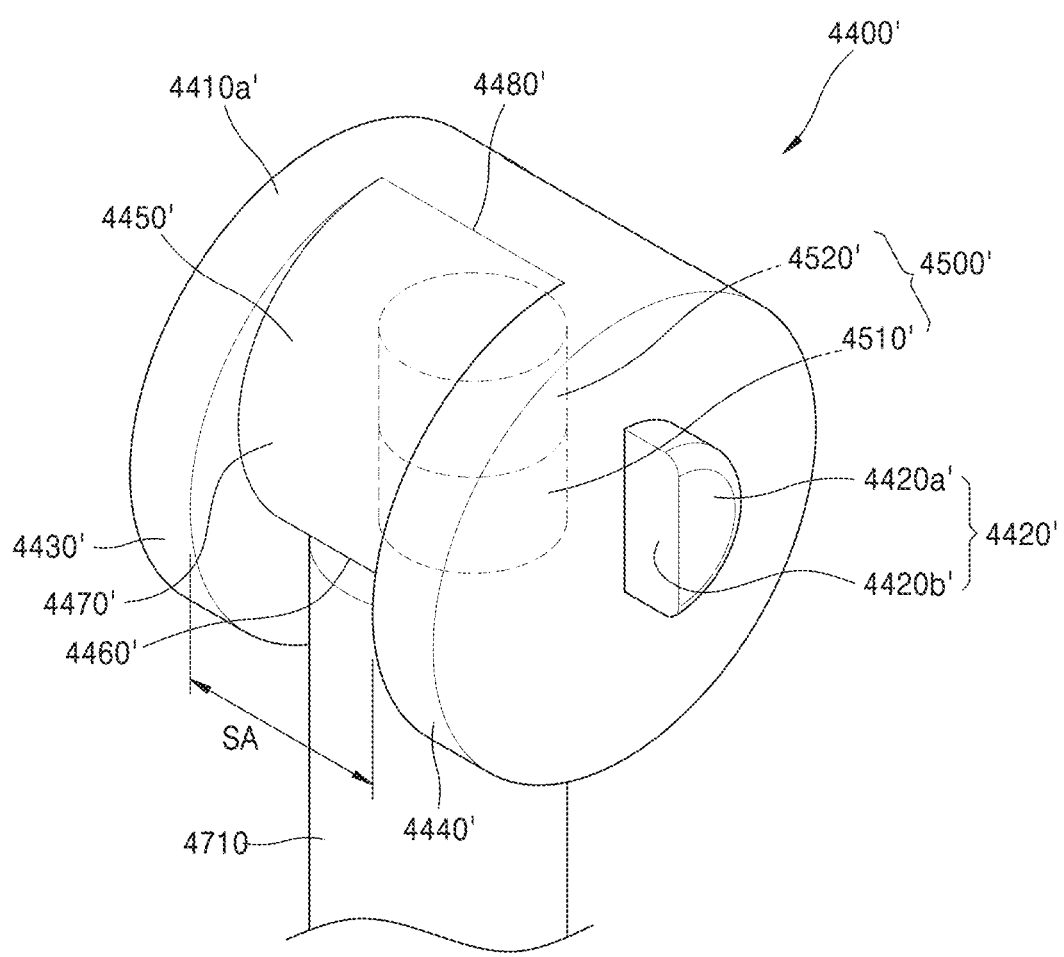
FIG. 34 is a diagram illustrating one alternative embodiment of the driving unit of the information output apparatus of FIG. 32.

FIG. 32 is a front view schematically illustrating operations of an information output apparatus according to an embodiment of the present disclosure. FIG. 33 is a diagram for describing a driving unit of FIG. 32, and FIG. 34 is a diagram illustrating one alternative embodiment of the driving unit of the information output apparatus of FIG. 32.

Figure 35:
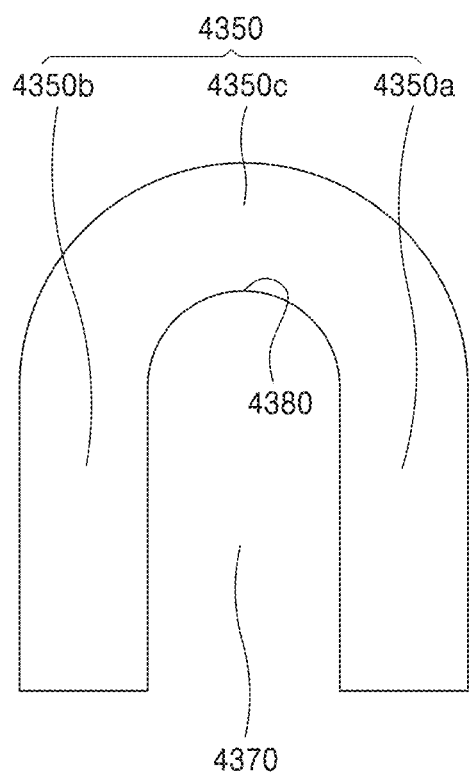
FIG. 35 is a diagram for describing a guide groove of the information output apparatus of FIG. 32.

FIG. 35 is a diagram for describing a guide groove of the information output apparatus of FIG. 32.

Referring to FIGS. 32 to 35, an information output apparatus 4000 of the present embodiment includes at least one information output unit, and FIG. 32 illustrates one information output unit. That is, the information output apparatus 4000 of FIG. 32 may be one information output unit.

One information output unit is illustrated in FIG. 32, but in an alternative embodiment, the information output apparatus 4000 may include two or three or more information output units.

That is, the information output apparatus 4000 may include various numbers of information output units according to purposes, characteristics of applied products, and user characteristics.

For convenience of description, an information output apparatus including one information output unit as shown in FIG. 32 will be described.

The information output apparatus 4000 may include a coil unit 4200, a base unit 4300, a driving unit 4400, and an expression unit 4100.

Further, the base unit 4300 may include one or more guide grooves 4350.

The expression unit 4100 may move according to the movement of the driving unit 4400, which will be described below, and may move downward and upward with respect to a lengthwise direction of the expression unit 4100. For example, the expression unit 4100 may move in one direction toward the coil unit 4200 and a direction opposite thereto.

Accordingly, the expression unit 4100 may move to protrude in one direction, and a user may sense the movement of the expression unit 4100 through a tactile or visual sense.

The expression unit 4100 may include an expression surface 4110 and a support surface 4120.

The support surface 4120 is a surface of the expression unit 4100 facing the driving unit 4400, and may form a lower region of the expression unit 4100 and may be in contact with the driving unit 4400. The driving unit 4400 may transmit power to the expression unit 4100 through the support surface 4120. For example, a driving surface 4410a of the driving unit 4400 may be in contact with the support surface 4120 to move the support surface 4120 in a first direction, that is, a Z-axis direction in FIG. 32.

In an alternative embodiment, the support surface 4120 may include a curved surface, and accordingly, a driving force may be flexibly transmitted through the driving unit 4400.

The expression surface 4110 is an outermost side of the expression unit 4100, for example, a region of the expression unit 4100 farthest from the coil unit 4200, and may include a region recognized by a user.

For example, the user may recognize the entire region of the expression unit 4100, but may also recognize only the expression surface 4110. For example, the user may sense the movement of the expression unit 4100 by contacting the expression surface 4110, and also may easily sense the movement of the expression unit 4100 by visually sensing the expression surface 4110.

In an alternative embodiment, the expression surface 4110 may include a curved surface.

The expression unit 4100 may have various shapes and may include a pillar-shaped region, for example, a region having an approximately cylindrical shape.

Further, in an alternative embodiment, a protruding region of the expression unit 4100 may have a curved surface or curved corners.

The expression unit 4100 may include various materials or may be made of an insulating material that is light-weight and has an excellent durability. For example, the expression unit 4100 may include a resin-based organic material. In another example, the expression unit 4100 may include an inorganic material like a ceramic.

Further, in another alternative embodiment, the expression unit 4100 may be made of a metal or glass material.

The coil unit 4200 may be formed to be connected to an external power supply (not shown). When a current flows in the coil unit 4200, a magnetic field may be formed around the coil unit 4200.

The coil unit 4200 may have various shapes, for example, the coil unit 4200 may have a shape in which an electric wire is wound a plurality of times, and the number of times that the electric wire is wound may be variously adjusted.

Due to a magnetic field formed by the current flowing in the coil unit 4200, the driving unit 4400 may move, and the movement of the driving unit 4400 may provide a driving force that enables the expression unit 4100 to move.

In an alternative embodiment, a support unit 4700 may be further disposed, and the support unit 4700 may be disposed such that at least one region thereof may be adjacent to or support the coil unit 4200.

For example, the support unit 4700 includes an extension member 4710, and may be disposed such that the extension member 4710 passes through the coil unit 4200, and as a specific example, the support unit 4700 may have a shape in which a plurality of coils of the coil unit 4200 are wound around the extension member 4710.

In an alternative embodiment, one end of the extension member 4710 may be elongated to overlap one region of the driving unit 4400 to be described below, or may be formed to support the one region.

In an alternative embodiment, the support unit 4700 includes a body member 4720, and the extension member 4710 may be connected to the body member 4720.

As a specific example, the extension member 4710 may have a shape extending long in a direction close to the expression unit 4100 from the body member 4720.

In an alternative embodiment, the coil unit 4200 may include coils in a shape wound around the extension member 4710 on the body member 4720.

In an alternative embodiment, the body member 4720 and the extension member 4710 of the support unit 4700 may be integrally formed.

In an alternative embodiment, although not shown in the drawings, the support unit 4700 may further include a supporting portion (not shown) to support the body member 4720, and the body member 4720 may be disposed on the supporting portion (not shown).

The base unit 4300 may be formed to accommodate the coil unit 4200. For example, the base unit 4300 may include a first accommodation portion 4310, a second accommodation portion 4320, and the guide grooves 4350.

The first accommodation portion 4310 and the second accommodation portion 4320 may be disposed to be adjacent to each other and may be disposed not to overlap each other.

In an alternative embodiment, the first accommodation portion 4310 may be spaced apart from the second accommodation portion 4320.

In another alternative embodiment, the first accommodation portion 4310 may be connected to the second accommodation portion 4320 through a through hole.

The coil unit 4200 may be disposed in the first accommodation portion 4310.

In an alternative embodiment, the above-described support unit 4700 may be disposed in the first accommodation portion 4310, and in another alternative embodiment, although not shown in the drawings, one region of the support unit 4700, for example, one region of the extension member 4710 may be elongated and disposed up to the second accommodation portion 4320 through the through hole.

The guide grooves 4350 may be formed in the second accommodation portion 4320. For example, the guide grooves 4350 may be formed on both inner side surfaces of the second accommodation portion 4320 of the base unit 4300 facing each other, and in another alternative embodiment, the guide groove 4350 may be formed only on one inner side surface thereof.

The guide groove 4350 may have a through-hole shape, and as another example, may have a groove shape that is not exposed to the outside of the base unit 4300.

Referring to FIG. 35, the guide groove 4350 may include a first groove 435a0, a second groove 435b0, and a connection groove 435c0.

The first groove 435a0 and the second groove 435b0 may be spaced apart from each other, and in an alternative embodiment, an intermediate portion 4370 may be formed between the first groove 435a0 and the second groove 435b0.

The contents of the guide groove 4350 are the same as those of the embodiment described with reference to FIG. 15, and thus a detailed description thereof will be omitted.

The base unit 4300 may have a shape extending long to accommodate the coil unit 4200 and the driving unit 4400, or may be formed to entirely surround both the coil unit 4200 and the driving unit 4400.

In an alternative embodiment, the base unit 4300 may include a boundary 4330 between the first accommodation portion 4310 and the second accommodation portion 4320.

The first accommodation portion 4310 may be separated from the second accommodation portion 4320 through the boundary 4330.

In an alternative embodiment, although not shown in the drawings, a through hole may be formed in the boundary 4330, and the through hole may be disposed such that one region of the extension member 4710 of the support unit 4700 extends and passes therethrough.

Further, the base unit 4300 includes an entry 430a0, and the entry 430a0 may be connected to the second accommodation portion 4320. The expression unit 4100 may move through the entry 430a0 such that a length at which the expression unit 4100 protrudes to the outside of the base unit 4300 is changed.

In an alternative embodiment, the base unit 4300 may include an open region 4390, and specifically, the open region 4390 may be formed to be connected to the first accommodation portion 4310.

The support unit 4700 and the coil unit 4200 may be easily disposed, replaced, or repaired through the open region 4390.

The driving unit 4400 may be disposed in the base unit 4300. The driving unit 4400 may be disposed in the second accommodation portion 4320 and may be spaced apart from the coil unit 4200 that is disposed in the first accommodation portion 4310.

The driving unit 4400 may be disposed to be adjacent to the coil unit 4200, and may be driven by a current flowing in the coil unit 4200 to perform an angular movement or a rotational movement. The expression unit 4100 may move downward and upward, for example, in one direction toward the coil unit and a direction opposite thereto due to the driving unit 4400.

A magnetic unit 4500 may be disposed in an inner space of the driving unit 4400. For example, the magnetic unit 4500 may include a magnetic material, and for example, may include a permanent magnet.

The magnetic unit 4500 may have a first region 4510 (e.g., an N-pole or an S-pole) and a second region 4520 (e.g., S-pole or an N-pole) of different polarities, and the first region 4510 and the second region 4520 of different polarities may be arranged in a direction toward the expression unit 4100 from the coil unit 4200, for example, in the Z-axis direction, at one point during the rotation of the driving unit 4400.

The driving unit 4400 includes the driving surface 4410a on at least one outer surface thereof, and the driving surface 4410a may be formed to support the expression unit 4100 and may provide a driving force for the downward and upward movement of the expression unit 4100.

In an alternative embodiment, the driving surface 4410a of the driving unit 4400 may be an external surface of the driving unit 4400 and may include a curved surface. In more specific embodiment, the driving surface 4410a of the driving unit 4400 may include a boundary line having an approximately circular shape.

The driving unit 4400 may include a driving control part 4420. Although not specifically shown in the drawings, in an alternative embodiment, the driving control parts 4420 may be disposed on both side surfaces of the driving unit 4400.

The position of the driving unit 4400 at the time of driving may be controlled through the driving control part 4420. For example, when the driving unit 4400 is moved by the coil unit 4200, the driving unit 4400 may move in a state in which the driving control part 4420 is disposed in the guide groove 4350.

The driving control part 4420 may have a protruding shape, for example, a shape protruding from a side surface of the driving unit 4400, and the driving control part 4420 may be disposed in the guide groove 4350.

In an alternative embodiment, the driving control part 4420 may include an outer side surface 4420a and an inner side surface 4420b.

In the present embodiment, the driving unit 4400 may include an adjacent driving part 4450 formed on one region thereof.

In an alternative embodiment, the adjacent driving part 4450 may be disposed at a position overlapping the magnetic unit 4500.

When the driving unit 4400 performs the rotational or angular movement, the adjacent driving part 4450 may be moved and supported together with the driving unit 4400. For example, the adjacent driving part 4450 may be supported by one end of the extension member 4710 of the support unit 4700. As another example, the base unit 4300 may have a shape extending in a direction of the extension member 4710, and the extending region may support the adjacent driving part 4450.

The adjacent driving part 4450 may include a first region 4460, a second region 4480, and a connection region 4470 having different distances from the driving surface 4410a of the driving unit 4400, and the first region 4460, the second region 4480, and the connection region 4470 of the adjacent driving part 4450 are supported by the extension member 4710 of the support unit 4700 and thus the height of the driving unit 4400 may be changed.

FIG. 34 is a diagram illustrating one alternative embodiment of the driving unit of the information output apparatus of FIG. 32.

A driving unit 4400' may have a magnetic unit 4500' disposed in an inner space thereof, for example, the magnetic unit 4500' may include a magnetic material, and for example, may include a permanent magnet.

The magnetic unit 4500' may have a first region 4510' (e.g., an N-pole or an S-pole) and a second region 4520' (e.g., an S-pole or an N-pole) of different polarities.

The driving unit 4400' includes a driving surface 4410a' on at least an outer side surface thereof, and the driving surface 4410a' may be formed to support an expression unit

4100' and may provide a driving force for the downward and upward movement of the expression unit 4100'.

In an alternative embodiment, the driving surface 4410a' of the driving unit 4400' may be an external surface of the driving unit 4400' and may include a curved surface. In more specific embodiment, the driving surface 4410a' of the driving unit 4400' may include a boundary line having an approximately circular shape.

The driving unit 4400' may include a driving control part 4420'. The driving control part 4420' may include an outer side surface 4420a' and an inner side surface 4420b', and a description thereof may be applied in the same or similar manner as described in the aforementioned embodiments, and thus a detailed description thereof will be omitted.

The driving unit 4400' may include a first driving member 4430' and a second driving member 4440', and may include a separation space SA' therebetween.

The first driving member 4430' and the second driving member 4440' may each include the driving surface 4410a' on at least one outer surface thereof, and when the driving unit 4400' moves, the driving surfaces 4410a' may support the expression unit 4100' and provide the expression unit 4100' with a driving power.

In an alternative embodiment, the outer surfaces of the first driving member 4430' and the second driving member 4440' may include curved surfaces. For example, the first driving member 4430' and the second driving member 4440' may each have a shape similar to a rotating body, and may each have a shape similar to a disc.

Accordingly, when the first driving member 4430' and the second driving member 4440' perform a rotational or angular movement, the driving power is naturally provided to a support surface 4120 of the expression unit 4100 so that the expression unit 4100' may effectively perform a continuous and natural movement.

The driving control part 4420' may be disposed on at least one side surface of the first driving member 4430' and the second driving member 4440', for example, may be disposed on each of side surfaces of the first driving member 4430' and the second driving member 4440' opposite to side surfaces thereof facing each other.

An adjacent driving part 4450' may be disposed in the separation space SA' between the first driving member 4430' and the second driving member 4440'. The adjacent driving part 4450' may include a first region 4460', a second region 4480', and a connection region 4470'.

In an alternative embodiment, the adjacent driving part 4450' may be disposed at a position overlapping the magnetic unit 4500'.

In an alternative embodiment, the adjacent driving part 4450' may overlap a central axis of the coil unit 4200.

When the driving unit 4400' performs the rotational or angular movement, the adjacent driving part 4450' may be moved and supported together with the driving unit 4400', For example, the adjacent driving part 4450' may be supported by one end of the extension member 4710 of the support unit 4700.

The adjacent driving part 4450' may be formed to have a smaller width than each of the first driving member 4430' and the second driving member 4440', and the distance between an outer side surface of the adjacent driving part 4450' and the driving surface 4410a' of each of the first driving member 4430' and the second driving member 4440' may be different for each region.

For example, a distance between the first region 4460' and the driving surface 4410a' may have a greater value than a distance between the second region 4480' and the driving surface 4410a'.

Accordingly, a height at which the driving unit 4400' moves may vary according to an angular or rotational movement of the adjacent driving part 4450', and in this case, a distance between the coil unit 4200 and a region overlapping the adjacent driving part 4450', as a specific example, the magnetic unit 4500' disposed inside the adjacent driving part 4450' may not be changed significantly and may be kept constant or maintained within a certain range.

In an alternative embodiment, the connection region 4470' may be disposed between the first region 4460' and the second region 4480', and the connection region 4470' may include a curved surface.

When the driving unit 4400' rotates, the extension member 4710 may support the first region 4460' and then support at least one region of the connection region 4470' before supporting the second region 4480', and thus, the driving unit 4400' may naturally move and accordingly the movement of the expression unit 4100 may be precisely controlled.

Figure 36:
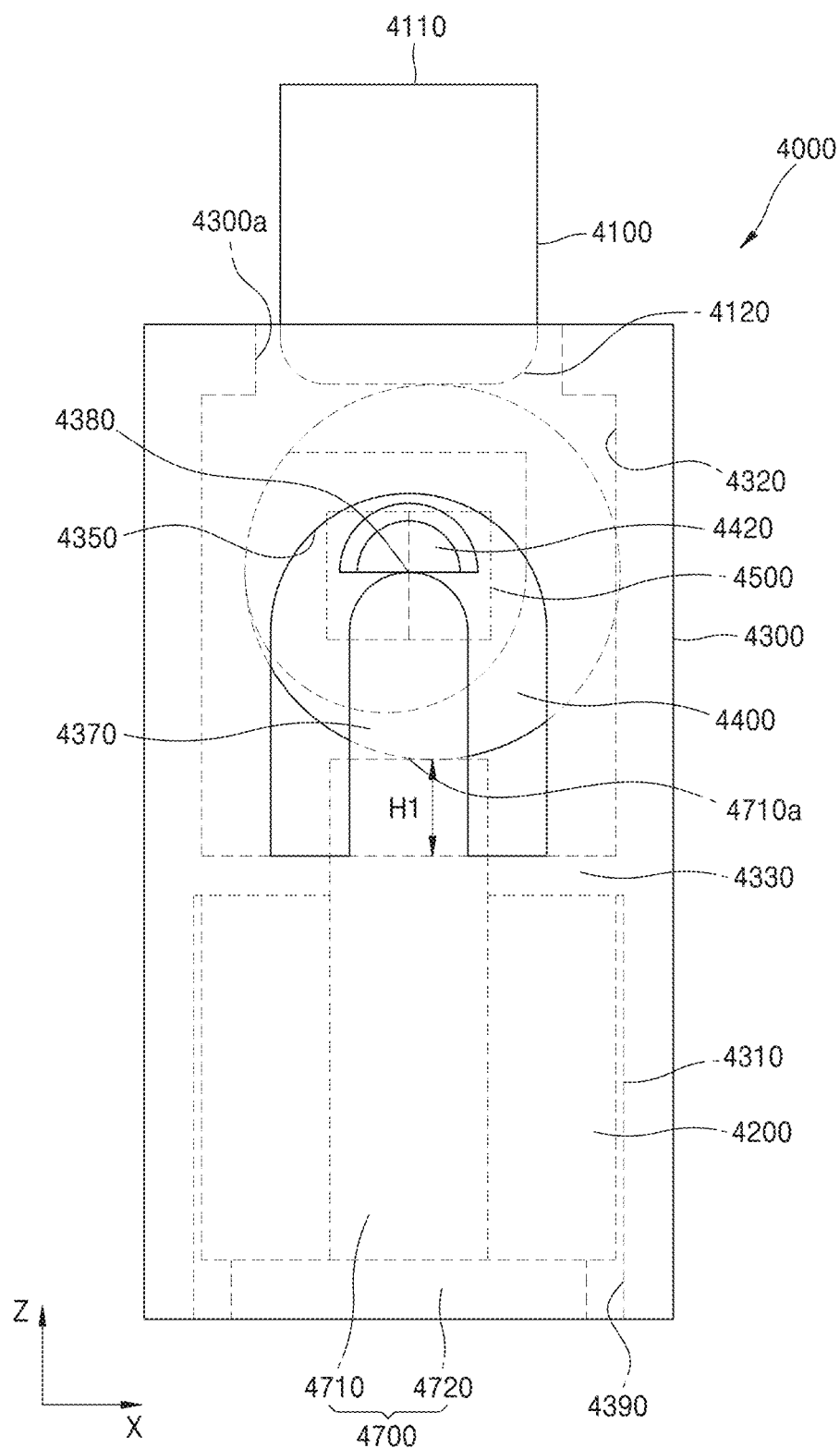
FIG. 36 and FIG. 37 are diagrams for describing operations of the information output apparatus of FIG. 32.
Figure 37:
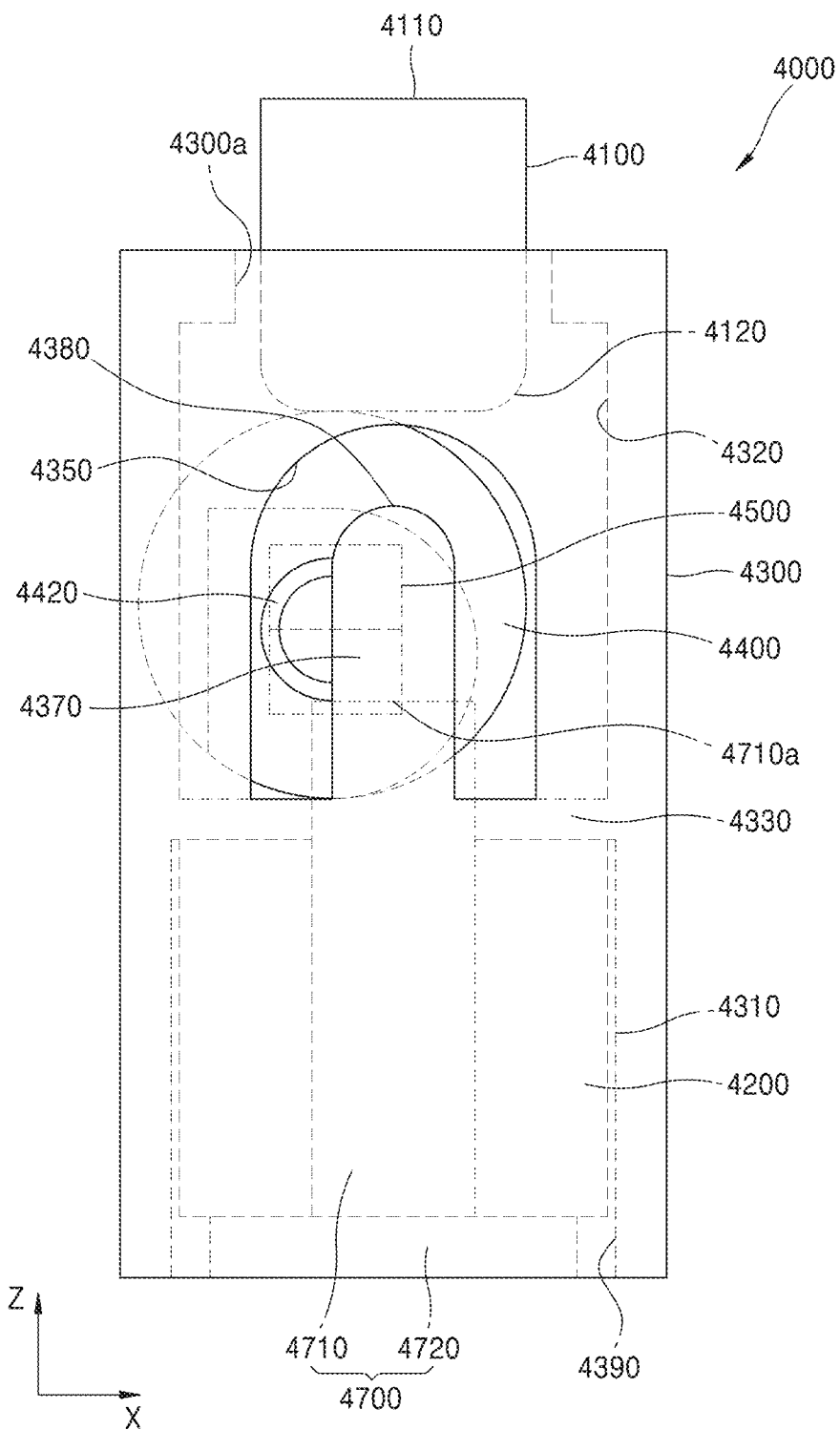

FIG. 36 and FIG. 37 are diagrams for describing operations of the information output apparatus of FIG. 32.

Referring to FIG. 36, it is illustrated that the driving unit 4400 is raised with respect to the position of the coil unit 4200 as compared to that of FIG. 32, and accordingly, the expression unit 4100 moves upward.

For example, when a current is applied to the coil unit 4200 and a magnetic field is formed, the driving unit 4400 may move, for example, when a repulsive force acts on the first region of the magnetic unit 4500 disposed on the driving unit 4400, the driving unit 4400 may be raised by the repulsive force acted on the magnetic unit 4500. For example, the driving unit 4400 may be raised by as much as a height H1.

After that, referring to FIG. 37, it is illustrated that the driving unit 4400 continues to move due the magnetic field formed by the coil unit 4200, that is, a repulsive force acts on the first region of the magnetic unit 4500 and an attractive force acts on the second region, and thus the driving unit 4400 performs an angular movement while moving upward.

In this case, since the driving control part 4420 moves within the guide groove 4350, the driving control part 4420 may pass through an upper surface 4380 of the intermediate portion 43700, and in some cases, may be maintained at the upper surface 4380.

The driving control part 4420 may pass through the upper surface 4380 and may be disposed in the second groove 435b0 within the guide groove 4350.

That is, referring to FIG. 37, the driving unit 4400 may descend after reaching a highest point, and the driving control part 4420 may be disposed at a lowest point of the second groove 435b0 of the guide groove 4350 within the guide groove 4350.

Such a motion shown in FIG. 37 may be due to a repulsive force acting on the first region of the magnetic unit 4500 and an attractive force acting on the second region 4520 at the highest point that the driving unit 4400 may reach. In addition, as another example, after the driving control part 4420 has already reached a certain height or to be higher in the guide groove 4350, the driving unit 4400 may be lowered by gravity even when there is no magnetic field through a separate coil unit 4200.

Accordingly, the power for driving the driving unit 4400 may be reduced.

The information output apparatus according to the present embodiment may include one or more information output units, the driving unit of the information output unit may move at least in the first direction and a direction opposite thereto, and the expression unit may also move in the first direction or the direction opposite thereto according to the movement of the driving unit, thereby outputting various pieces of information which may be sensed by a user.

For example, the information output apparatus according to the present embodiment may be an information output apparatus in which, when the expression unit protrudes, the user senses the surface of the expression unit through a tactile sense. More particularly, for example, information may be output in the form of Braille output.

In an alternative embodiment, the information output apparatus may be a visually-sensing type information output apparatus in which, when the expression unit protrudes, the user may visually sense the protrusion. Particularly, when a color is formed on one surface of the expression unit, for example, an upper surface, or when one surface of the expression unit is formed to emit light, the visual sensing effect may be increased.

Accordingly, the information output apparatus according to the present embodiment may output information to a user, and in an alternative embodiment, the information output apparatus according to the present embodiment may output various pieces of information to the user when the information output apparatus includes a plurality of information output units.

Further, in more detail, the driving unit may be easily moved in the first direction by the magnetic field formed by the coil unit, for example, may be raised.

For example, when a repulsive force is generated by the magnetic field, which is formed by the coil unit according to polarities of the magnetic unit disposed in the driving unit, the driving unit may move upward while performing the angular or rotational movement. In this case, the driving control part disposed in the driving unit may be easily raised and lowered according to the shape of the guide groove, and in an alternative embodiment, the driving control part may be moved along a smooth path according to the curved or circular arc shape of the connection groove of the guide groove.

Accordingly, the moving up and down of the driving unit may be performed softly, naturally, and precisely, and accordingly, an irregular intermittence in moving up and down of the expression unit may be reduced. In addition, the soft, natural, and precise movement may be easily controlled.

Since the expression unit moves up and down, an ON-state or an OFF-state of the information output apparatus may be easily implemented.

The driving unit of the information output apparatus of the present embodiment includes the adjacent driving part, and the adjacent driving part may be supported during the rotational or angular movement of the driving unit, and the distance between the adjacent driving part and the driving surface of the driving unit is different for each region, so that the driving unit may rise and descend. Accordingly, a change in the distance between the magnetic unit and the coil unit may be reduced, so that non-uniformity of the driving force of the driving unit may be reduced, and through this, a characteristic in which the expression unit is non-uniformly raised and lowered may be improved.

Further, in an alternative embodiment, the driving surface of the driving unit has a curved surface, and more specifically, the driving surface of the driving unit has a shape similar to a circle in a plan view, thereby precisely controlling changes in the motion of the expression unit.

Further, in an alternative embodiment, the driving control part may be raised and disposed on the upper surface of the intermediate portion, and in this case, even when a force such as a magnetic field through the coil unit is not applied to the driving unit, the driving unit may be maintained in the current state.

Further, when the driving control part starts to move to the second groove of the guide groove by the magnetic field in the opposite direction formed by the coil unit, the driving unit may be lowered by gravity even when power, or current or voltage applied to the coil unit is removed.

Accordingly, an ON state and an OFF state of the expression unit of the information output apparatus may be easily switched and maintained, power consumption for the movement of the expression unit may be reduced, and the overall energy efficiency of the information output apparatus may be improved.

Figure 38:
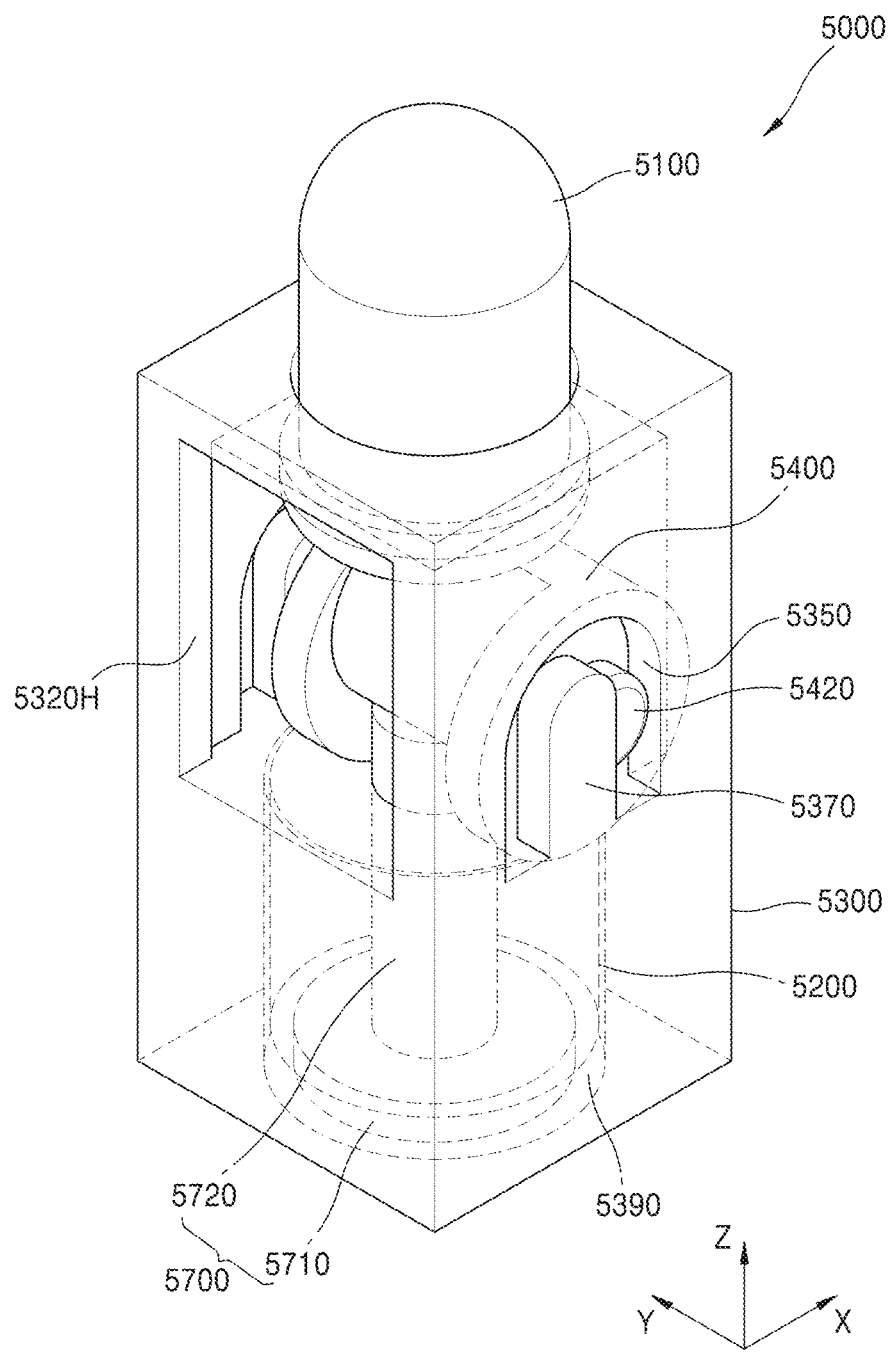
FIG. 38 is a perspective view schematically illustrating operations of an information output apparatus according to an embodiment of the present disclosure.
Figure 39:
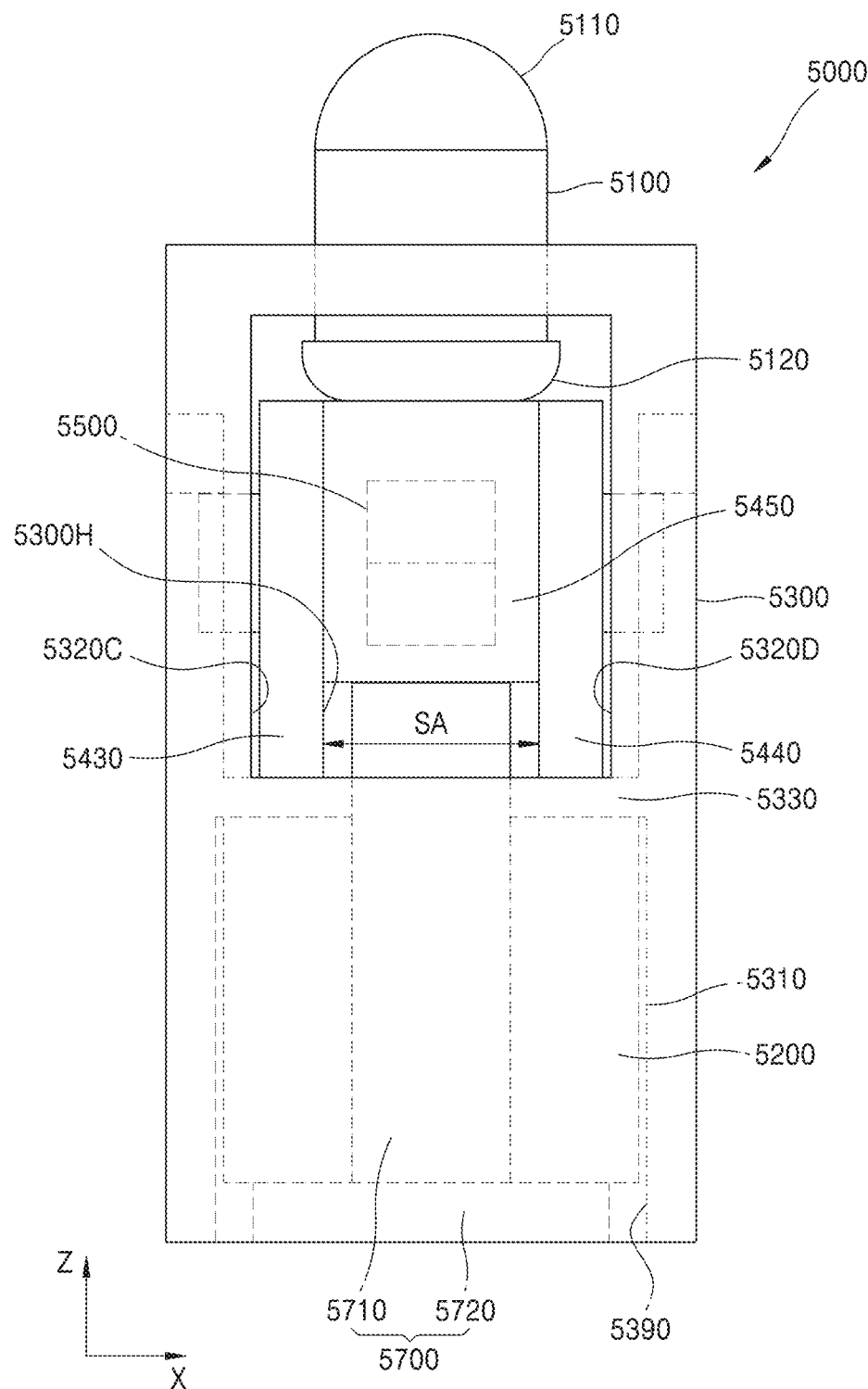
FIG. 39 is a side view of FIG. 39 when viewed from one direction.

FIG. 38 is a perspective view schematically illustrating operations of an information output apparatus according to an embodiment of the present disclosure, and FIG. 39 is a side view of FIG. 39 when viewed from one direction.

Specifically, FIG. 39 is a side view of FIG. 38 when viewed from the left side.

Referring to FIGS. 38 and 39, an information output apparatus 5000 of the present embodiment includes at least one information output unit, and FIG. 38 illustrates one information output unit. That is, the information output apparatus 5000 of FIG. 38 may be one information output unit.

The information output apparatus 5000 may include a coil unit 5200, a base unit 5300, a driving unit 5400, and an expression unit 5100.

Further, the base unit 5300 may include one or more guide grooves 5350.

The expression unit 5100 may move according to the movement of the driving unit 5400, which will be described below, and may move downward and upward with respect to a lengthwise direction of the expression unit 5100. For example, the expression unit 5100 may move in one direction toward the coil unit 5200 and a direction opposite thereto.

Accordingly, the expression unit 5100 may move to protrude in one direction, and a user may sense the movement of the expression unit 5100 through a tactile or visual sense.

The expression unit 5100 may include an expression surface 5110 and a support surface 5120.

The support surface 5120 is a surface of the expression unit 5100 facing the driving unit 5400, and may form a lower region of the expression unit 5100 and may be in contact with the driving unit 5400. The driving unit 5400 may transmit power to the expression unit 5100 through the support surface 5120.

In an alternative embodiment, the support surface 5120 may include a curved surface, and accordingly, a driving force may be flexibly transmitted through the driving unit 5400.

The expression surface 5110 is an outermost side of the expression unit 5100, for example, a region of the expression unit 5100 farthest from the coil unit 5200, and may include a region recognized by a user.

For example, the user may recognize the entire region of the expression unit 5100, but may also recognize only the expression surface 5110. For example, the user may sense the movement of the expression unit 5100 by contacting the expression surface 5110, and also may easily sense the movement of the expression unit 5100 by visually sensing the expression surface 5110.

In an alternative embodiment, the expression surface 5110 may include a curved surface.

The expression unit 5100 may have various shapes and may include a pillar-shaped region, for example, a region having an approximately cylindrical shape.

Further, in an alternative embodiment, a protruding region of the expression unit 5100 may have a curved surface or curved corners.

The expression unit 5100 may include various materials or may be made of an insulating material that is light-weight and has an excellent durability. For example, the expression unit 5100 may include a resin-based organic material. In another example, the expression unit 5100 may include an inorganic material like a ceramic.

Further, in another alternative embodiment, the expression unit 5100 may be made of a metal or glass material.

The coil unit 5200 may be formed to be connected to an external power supply (not shown). The contents of the coil unit 5200 are the same as those of the above-described embodiments, and thus a description thereof will be omitted.

In an alternative embodiment, a support unit 5700 may be further disposed, and the support unit 5700 may be disposed such that at least one region thereof may be adjacent to or support the coil unit 5200.

For example, the support unit 5700 includes an extension member 5710, and may be disposed such that the extension member 5710 passes through the coil unit 5200, and as a specific example, the support unit 5700 may have a shape in which a plurality of coils of the coil unit 5200 are wound around the extension member 5710.

In an alternative embodiment, one end of the extension member 5710 may be elongated to overlap one region of the driving unit 5400, or may be formed to support the one region.

In an alternative embodiment, the support unit 5700 includes a body member 5720, and the extension member 5710 may be connected to the body member 5720.

As a specific example, the extension member 5710 may have a shape extending long in a direction close to the expression unit 5100 from the body member 5720.

In an alternative embodiment, the coil unit 5200 may include coils in a shape wound around the extension member 5710 on the body member 5720.

In an alternative embodiment, the body member 5720 and the extension member 5710 of the support unit 5700 may be integrally formed.

In an alternative embodiment, although not shown in the drawings, the support unit 5700 may further include a supporting portion (not shown) to support the body member 5720, and the body member 5720 may be disposed on the supporting portion (not shown).

The base unit 5300 may be formed to accommodate the coil unit 5200. For example, the base unit 5300 may include a first accommodation portion 5310, a second accommodation portion 5320, and the guide grooves 5350.

The first accommodation portion 5310 and the second accommodation portion 5320 may be disposed to be adjacent to each other and may be disposed not to overlap each other.

In an alternative embodiment, the first accommodation portion 5310 may be spaced apart from the second accommodation portion 5320.

In another alternative embodiment, the first accommodation portion 5310 may be connected to the second accommodation portion 5320 through a through hole 5300H.

The coil unit 5200 may be disposed in the first accommodation portion 5310.

In an alternative embodiment, the above-described support unit 5700 may be disposed in the first accommodation portion 5310, and in another alternative embodiment, one region of the support unit 5700, for example, one region of the extension member 5710 may be elongated and disposed up to the second accommodation portion 5320 through the through hole 5300H.

The guide grooves 5350 may be formed in the second accommodation portion 5320. For example, the guide grooves 5350 may be formed on both inner side surfaces of the second accommodation portion 5320 of the base unit 5300 facing each other, and in another alternative embodiment, the guide groove 5350 may be formed only on one inner side surface thereof.

The guide groove 5350 may have a through-hole shape, and as another example, may have a groove shape that is not exposed to the outside of the base unit 5300.

The contents of the guide grooves 5350 are the same as those of the above-described embodiments, and thus a description thereof will be omitted.

The base unit 5300 may have a shape extending long to accommodate the coil unit 5200 and the driving unit 5400, or may be formed to entirely surround both the coil unit 5200 and the driving unit 5400.

In an alternative embodiment, the base unit 5300 may include a boundary 5330 between the first accommodation portion 5310 and the second accommodation portion 5320.

The first accommodation portion 5310 may be separated from the second accommodation portion 5320 through the boundary 5330.

Further, the base unit 5300 includes an entry, and the entry may be connected to the second accommodation portion 5320. The expression unit 5100 may move through the entry such that a length at which the expression unit 5100 protrudes to the outside of the base unit 5300 is changed.

In an alternative embodiment, the base unit 5300 may include an open region 5390, and specifically, the open region 5390 may be formed to be connected to the first accommodation portion 5310.

The support unit 5700 and the coil unit 5200 may be easily disposed, replaced, or repaired through the open region 5390.

In an alternative embodiment, a window 5320H may be formed, which is connected to one region of the second accommodation portion 5320 of the base unit 5300. Through the window 5320H, the state of the second accommodation portion 5320, for example, the state or operation of the driving unit 5400 may be confirmed or inspected even when the expression unit 5100 is not separated.

In another alternative embodiment, the width and height of the window 5320H may be greater than or at least equal to the width and height of the driving unit 5400. Accordingly, if necessary, the driving unit 5400 may be easily pulled out or inserted through the window 5320H, and may also be easily replaced, repaired, or inspected.

The driving unit 5400 may be disposed in the base unit 5300. The driving unit 5400 may be disposed in the second accommodation portion 5320 and may be spaced apart from the coil unit 5200 that is disposed in the first accommodation portion 5310.

The driving unit 5400 may be disposed to be adjacent to the coil unit 5200, and may be driven by a current flowing in the coil unit 5200 to perform an angular movement or a rotational movement. The expression unit 5100 may move downward and upward, for example, in one direction toward the coil unit and a direction opposite thereto due to the driving unit 5400.

A magnetic unit 5500 may be disposed in an inner space of the driving unit 5400. For example, the magnetic unit 5500 may include a magnetic material, and for example, may include a permanent magnet.

The magnetic unit 5500 may have a first region (e.g., an N-pole or an S-pole) and a second region (e.g., an S-pole or an N-pole) of different polarities, and the first region and the second region of different polarities may be arranged in a direction toward the expression unit 5100 from the coil unit 5200, for example, in a Z-axis direction, at one point during the rotation of the driving unit 5400.

The driving unit 5400 includes a driving surface on at east one outer surface thereof, and the driving surface may be formed to support the support surface 5120 of the expression unit 5100 and may provide a driving force for the downward and upward movement of the expression unit 5100.

The driving unit 5400 may include a driving control part 5420.

In the present embodiment, the driving unit 5400 may include an adjacent driving part 5450 formed on one region thereof.

In an alternative embodiment, the adjacent driving part 5450 may be disposed at a position overlapping the magnetic unit 5500.

The driving unit 5400 may include a first driving member 5430 and a second driving member 5440, and may include a separation space SA therebetween.

An adjacent driving part 5450 may be disposed in the separation space SA between the first driving member 5430 and the second driving member 5440.

Descriptions of the driving unit 5400 and the driving control part 5420 may be applied in the same or similar manner as described in the aforementioned embodiments, and thus detailed descriptions thereof will be omitted.

The second accommodation portion 5320 of the base unit 5300 may include a first groove 53200 and a second groove 5320D.

The first groove 53200 and the second groove 5320D may be elongated in a direction of the coil unit 5200. The first driving member 5430 and the second driving member 5440 may be disposed to correspond to the first groove 5320C and the second groove 532d0, respectively, and accordingly, when a driving force from the coil unit 5200 is transmitted to the driving unit 5400, the driving unit 5400 may perform the angular or rotational movement and may also perform the downward and upward movement while the first groove 5320C and the second groove 5320D of the driving unit 5400 are being disposed to correspond to the first groove 5320C and the second groove 5320D, respectively. Accordingly, the driving unit 5400 may move stably, and thus the movement control for the expression unit 5100 may be easily performed.

In an alternative embodiment, a protruding region may be formed between the first groove 5320C and the second groove 5320D. For example, the through hole 5300H may be formed in the protruding region.

The extension member 5710 of the support unit 5700 may correspond to the through hole 5300H. Here, the extension member 5710 may protrude through the through hole 5300H and protrude further than the protruding region, and in an alternative embodiment, the extension member 5710 may not protrude further than the protruding region or may protrude to be coplanar with the protruding region.

The information output apparatus according to the present embodiment may include one or more information output units, the driving unit of the information output unit may move at least in the first direction and a direction opposite thereto, and the expression unit may also move in the first direction or the direction opposite thereto according to the movement of the driving unit, thereby outputting various pieces of information which may be sensed by a user.

For example, the information output apparatus according to the present embodiment may be an information output apparatus in which, when the expression unit protrudes, the user senses the surface of the expression unit through a tactile sense. More particularly, for example, information may be output in the form of Braille output.

In an alternative embodiment, the information output apparatus may be a visually-sensing type information output apparatus in which, when the expression unit protrudes, the user may visually sense the protrusion. Particularly, when a color is formed on one surface of the expression unit, for example, an upper surface, or when one surface of the expression unit is formed to emit light, the visual sensing effect may be increased.

Accordingly, the information output apparatus according to the present embodiment may output information to a user, and in an alternative embodiment, the information output apparatus according to the present embodiment may output various pieces of information to the user when the information output apparatus includes a plurality of information output units.

The driving unit of the information output apparatus of the present embodiment includes the adjacent driving part, and the adjacent driving part may be supported during the rotational or angular movement of the driving unit, and the distance between the adjacent driving part and the driving surface of the driving unit is different for each region, so that the driving unit may rise and descend. Accordingly, a change in the distance between the magnetic unit and the coil unit may be reduced, so that non-uniformity of the driving force of the driving unit may be reduced, and through this, a characteristic in which the expression unit is non-uniformly raised and lowered may be improved.

Further, in an alternative embodiment, the driving surface of the driving unit has a curved surface, and more specifically, the driving surface of the driving unit has a shape similar to a circle in a plan view, thereby precisely controlling changes in the motion of the expression unit.

Further, by forming the first groove and the second groove in the second accommodation part of the base unit so as to respectively correspond to the regions of the first driving member and the second driving member of the driving unit, the situation in which the position of the driving unit is abnormally changed during the movement of the driving unit is reduced or prevented, so that stable movement of the driving unit is secured, thereby precisely controlling the movement of the expression unit.

Figure 40:
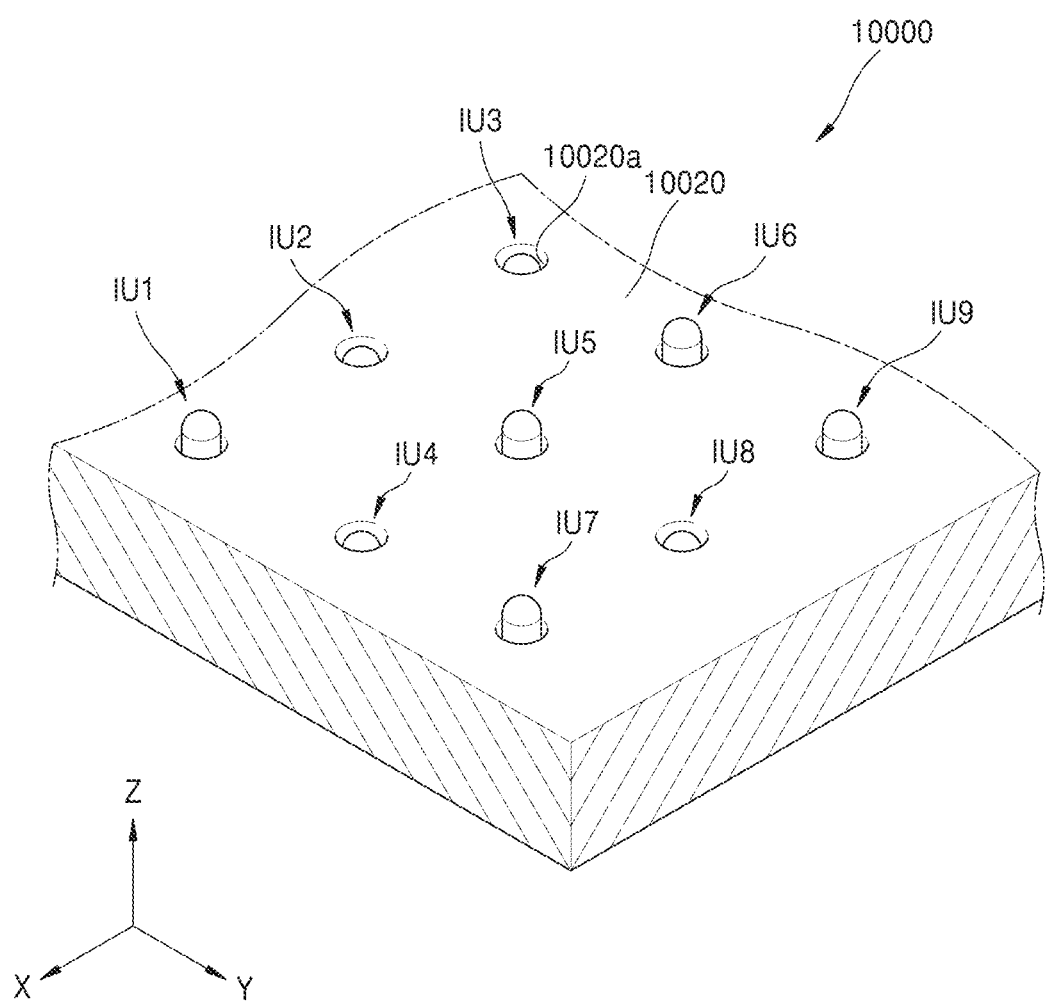
FIG. 40 is a perspective view schematically illustrating an information output apparatus according to an embodiment of the present disclosure.

FIG. 40 is a perspective view schematically illustrating an information output apparatus according to an embodiment of the present disclosure.

Referring to FIG. 40, an information output apparatus 10000 according to the present embodiment includes a plurality of information output units IU1, IU2, . . . , and IU90.

Nine information output units are illustrated in FIG. 40, but in an alternative embodiment, the information output apparatus 10000 may include various numbers of information output units.

That is, the information output apparatus 10000 may include various numbers of information output units according to purposes, characteristics of applied products, and user characteristics.

Meanwhile, the information output apparatus 10000 may include a housing 10020 to protect the plurality of information output units IU1, IU2, . . . , and IU90, and the housing 10020 may include via holes 10020a corresponding to respective information output units.

The contents of each information output unit are the same as those of the above-described embodiments, and thus a description thereof will be omitted.

The base unit 1300, 2300, 4300, or 5300 in the above-described embodiment may have a shape extending long to correspond to at least the plurality of information output units.

Further, in another example, the base units 1300, 2300, 4300, or 5300 may be integrally formed to correspond to all of the plurality of information output units.

Further, in another example, the base units 1300, 2300, 4300, or 5300 may be individually formed to correspond to each of the plurality of information output units.

For example, the first accommodation part 1310, 2310, 4310, or 5310 and the second accommodation part 1310, 2310, 4310, or 5310 of the above-described embodiment may be provided for each of the formation output units IU1, IU2, . . . , and IU90.

Further, in an alternative embodiment, the housing 10020 shown in FIG. 40 may include the above-described information output apparatus 1000, 2000, 3000, 4000, or 5000 as a unit element therein.

The information output apparatus of the present embodiment may include a plurality of information output units, each of which is the same as described in the embodiments described above.

The information output apparatus according to the embodiment may respectively control the driving unit included in each of the units to move the expression unit, and various information that the user may sense may be output through the movement of the expression unit.

For example, the information output apparatus according to the present embodiment may be an information output apparatus in which, when the expression unit protrudes, the user senses the surface of the expression unit through a tactile sense. More particularly, for example, information may be output in the form of Braille output.

In an alternative embodiment, the information output apparatus may be a visually-sensing type information output apparatus in which, when the expression unit protrudes, the user may visually sense the protrusion. Particularly, when a color is formed on one surface of the expression unit, for example, an upper surface, or when one surface of the expression unit is formed to emit light, the visual sensing effect may be increased.

Although the present disclosure has been described with reference to the embodiments illustrated in the drawings, this is merely provided as an example and it will be understood by those of ordinary skill in the art that various changes in form and details and equivalents thereof may be made therein without departing from the spirit and scope of the disclosure as defined by the following claims. Accordingly, the genuine technical range of the present disclosure to be protected should be determined by the technical idea of the accompanying claims.

The particular implementations shown and described herein are illustrative examples of the embodiments and are not intended to otherwise limit the scope of the embodiments in any way. For the sake of brevity, conventional electronics, control systems, software development and other functional aspects of the systems may not be described in detail. Further, the connecting lines or connectors shown in the drawings are intended to represent example functional relationships and/or physical or logical couplings between the various elements. It should be noted that many alternative or additional functional relationships, physical connections, or logical connections may be present in a practical device. In addition, no item or element is essential to the practice of the present disclosure unless the element is specifically described as "essential" or "critical".

The use of the terms "a" and "an" and "the" and similar referents in the context of describing the present disclosure (especially in the context of the following claims) are to be construed to cover both the singular and the plural. Further, recitation of ranges of values herein are merely intended to serve as a shorthand method of referring individually to each separate value falling within the range, unless otherwise indicated herein, and each separate value is incorporated into the specification as if it were individually recited herein. Finally, operations of all methods described herein can be performed in any suitable order unless otherwise indicated herein or otherwise clearly contradicted by context. The present disclosure is not limited to the described order of the operations. The use of any and all examples, or exemplary terms (e.g. "such as") provided herein, is intended merely to better illuminate the present disclosure and does not pose a limitation on the scope of the present disclosure unless otherwise claimed. Also, numerous modifications and adaptations will be readily apparent to one of ordinary skill in the art without departing from the spirit and scope of the present disclosure.

INDUSTRIAL APPLICABILITY

One aspect of the present disclosure may provide an information output apparatus including an expression surface including a plurality of expression holes, a plurality of pins configured to protrude to the expression surface through the expression holes and express a protrusion signal on the expression surface, a plurality of driving units located at an inner side of the expression surface and each including a coil to which an electrical signal is applied, and a plurality of movement units which are located at the inner side of the expression surface and respectively interposed between the driving units and the pins, and each of which includes a magnetic force member and rotates in response to a signal applied to the coil to provide a motion to the pin.

What is claimed is:
1. An information output apparatus comprising:
an expression surface including a plurality of expression holes;
a plurality of pins configured to protrude to the expression surface through the expression holes and express a protrusion signal on the expression surface;
a plurality of driving units located at an inner side of the expression surface, each of the plurality of driving units including a coil to which an electrical signal is applied; and a plurality of movement units located at the inner side of the expression surface and respectively interposed between the driving units and the pins, each of the plurality of movement units including a magnetic force member and configured to rotate in response to a signal applied to the coil to provide a motion to the pins.

2. The information output apparatus of claim 1, wherein the expression surface comprises a curved surface.

3. The information output apparatus of claim 1, wherein the driving units and the movement units are provided to be physically separated from each other.

4. The information output apparatus of claim 1, wherein the magnetic force member is positioned to be spaced apart from a center of the movement units.

5. The information output apparatus of claim 1, wherein a center of rotation of the movement units is positioned to be spaced from a center of the movement units.

6. The information output apparatus of claim 1, wherein a center of rotation of the movement units is movably provided.

7. The information output apparatus of claim 1, further comprising a holder configured to support the movement units and including a support groove to which a center of rotation of the movement units is coupled.

8. The information output apparatus of claim 7, wherein the support groove comprises at least a linear section extending in a direction toward the pins from the driving units.

9. The information output apparatus of claim 1, wherein the driving units further comprise a support protruding toward the movement units.

10. An information output apparatus comprising at least one information output unit,
wherein the at least one information output unit comprises:
a coil unit disposed to be connected to a power supply, such that a current flows in the coil unit;
a base unit formed to accommodate the coil unit;
an expression unit formed and disposed to be sensed by a user;
a driving unit disposed in the base unit to be spaced apart from and adjacent to the coil unit, the driving unit configured to be driven by the current flowing in the coil unit to perform an angular movement or a rotational movement to allow the expression unit to move in a first direction toward the coil unit and a direction opposite thereto; and
a guide groove configured to guide a direction and range of movement of the driving unit and formed in one region of the base unit.

11. The information output apparatus of claim 10, wherein the at least one information output unit comprises a driving control part corresponding to the guide groove and formed in one region of the driving unit.

12. The information output apparatus of claim 10, wherein the at least one information output unit comprises a magnetic unit having regions of different polarities and disposed in the driving unit.

13. The information output apparatus of claim 10, wherein the driving unit comprises a driving surface on at least an outer surface thereof and is configured to transfer a driving force to the expression unit using the driving surface.

14. The information output apparatus of claim 13, wherein the at least one information output unit comprises an adjacent driving part formed to be spaced apart from the driving surface and configured to move together with the driving unit while being spaced apart from the expression unit.

15. The information output apparatus of claim 10, wherein the base unit further comprises a first accommodation part configured to accommodate the coil unit, and a second accommodation part disposed adjacent to the first accommodation part in the first direction and configured to accommodate the driving unit.

16. The information output apparatus of claim 15, wherein the at least one information output unit comprises a boundary disposed between the first accommodation part and the second accommodation part and formed to distinguish the first accommodation part from the second accommodation part.

17. The information output apparatus of claim 10, wherein the information output apparatus comprises a plurality of information output units, and
wherein the plurality of information output units are disposed to be spaced apart from each other in one direction or another direction different from the one direction.

* * * * *